United States Patent
Ohsawa

(10) Patent No.: US 9,835,438 B2
(45) Date of Patent: Dec. 5, 2017

(54) DISTANCE MEASURING APPARATUS AND METHOD

(71) Applicant: CANON KABUSHIKI KAISHA, Tokyo (JP)

(72) Inventor: Hiroyuki Ohsawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 182 days.

(21) Appl. No.: 14/097,080

(22) Filed: Dec. 4, 2013

(65) Prior Publication Data
US 2014/0307085 A1   Oct. 16, 2014

(30) Foreign Application Priority Data
Dec. 6, 2012  (JP) .................................. 2012-267557

(51) Int. Cl.
G01B 11/02     (2006.01)
G01B 11/25     (2006.01)
G06T 7/521     (2017.01)

(52) U.S. Cl.
CPC .......... *G01B 11/026* (2013.01); *G01B 11/25* (2013.01); *G06T 7/521* (2017.01); *G06T 2207/10152* (2013.01)

(58) Field of Classification Search
CPC ....... G01B 11/026; G01B 11/25; G06T 7/602; G06T 7/0057
See application file for complete search history.

(56) References Cited

U.S. PATENT DOCUMENTS

2002/0191834 A1* 12/2002 Fishbaine .......... G01B 11/2518
                                                         382/150
2009/0284757 A1* 11/2009 Mayer .................... G01B 11/25
                                                         356/602
(Continued)

FOREIGN PATENT DOCUMENTS

JP    2006-275529 A    10/2006
JP    2008-309551 A    12/2008
(Continued)

OTHER PUBLICATIONS

"Optimization Computation for 3-D Understanding of Images (II): Ellipse Fitting", The Journal of the Institute of Electronics, Information and Communication Engineers, JP, vol. 92, No. 4, 2009, pp. 301-306.
(Continued)

*Primary Examiner* — Jamie Atala
*Assistant Examiner* — Hesham Abouzahra
(74) *Attorney, Agent, or Firm* — Canon U.S.A., Inc. IP Division

(57) ABSTRACT

A distance measuring apparatus includes at least one projection unit configured to project a light pattern on a target object, at least one imaging unit configured to capture an image of the target object on which the light pattern is projected, an acquisition unit configured to acquire information about a distance from the projection unit or the imaging unit to the target object based on the image captured by the imaging unit, a grouping unit configured to group surfaces of the target object, and a determination unit configured to determine a light pattern to be projected by the projection unit based on the surfaces grouped by the grouping unit.

13 Claims, 15 Drawing Sheets

(56) References Cited

U.S. PATENT DOCUMENTS

| | | | | |
|---|---|---|---|---|
| 2010/0046801 A1* | 2/2010 | Ishiyama | ............... | G01C 3/08 |
| | | | | 382/106 |
| 2010/0328649 A1* | 12/2010 | Ota | ............... | G01B 11/25 |
| | | | | 356/73 |
| 2011/0164114 A1* | 7/2011 | Kobayashi | ............... | H04N 13/0253 |
| | | | | 348/46 |
| 2011/0211064 A1* | 9/2011 | Furui | ............... | H04N 9/31 |
| | | | | 348/135 |
| 2012/0293626 A1* | 11/2012 | Lee | ............... | G01B 11/2513 |
| | | | | 348/46 |
| 2014/0043436 A1* | 2/2014 | Bell | ............... | H04N 13/0203 |
| | | | | 348/46 |

FOREIGN PATENT DOCUMENTS

| | | |
|---|---|---|
| JP | 2009-019942 A | 1/2009 |
| JP | 2009-236917 A | 10/2009 |
| JP | 2011-257293 A | 12/2011 |
| JP | 2012-098087 A | 5/2012 |

OTHER PUBLICATIONS

Yuuki Iwamoto et al., "Bundle Adjustment for 3-D Reconstruction: Implementation and Evaluation", IPSJ SIG Technical Report, Journal of Information Processing Society of Japan, 2011, pp. 1-8.

* cited by examiner

DISTANCE MEASURING APPARATUS AND METHOD

BACKGROUND OF THE INVENTION

Field of the Invention

The present invention relates to a method for controlling a three-dimensional measuring apparatus that can measure a target object three-dimensionally.

Description of the Related Art

Various types of methods are conventionally proposed to measure a target object (e.g., a component of an industrial product) three-dimensionally. One of the conventional methods is a highly accurate and stable measuring method that includes projecting a predetermined projection pattern (e.g., a striped pattern or a lattice pattern) on a measurement target object and capturing an image of the measurement target object. The method further includes obtaining a correspondence relationship between each image position (i.e., a pixel) of the captured image and a corresponding striped position of the projection pattern, calculating the height of the measurement target object based on the triangulation, and measuring a three-dimensional shape of the measurement target object.

In the above-mentioned three-dimensional measurement method, multiple reflections may occur if the measurement target object (e.g., a metallic member) is glossy. More specifically, a projection pattern projected on one surface of the measurement target object may reflect on another surface of the measurement target object (may cause reflections multiple times) depending on the shape of the measurement target object. The reflection of light is referred to as primary reflection if it first reflects on a surface of the measurement target object. The reflection of light is referred to as secondary reflection if it sequentially reflects on two surfaces of the measurement target object. Further, the reflection of light is referred to as tertiary reflection if it sequentially reflects three times on the measurement target object. The above-mentioned secondary and higher-order reflections can be collectively referred to as multiple reflections. The multiple reflections can be also referred to as interreflection because reflections repetitively occur on different surfaces of the same measurement target object. If multiple reflections occur, a glare appears although it is not originally present on the measurement target object. If such a defective image is used in the three-dimensional measurement processing, the measurement accuracy may deteriorate due to a noise component caused by the glare.

To eliminate the glare, for example, as discussed in Japanese Patent Application Laid-Open No. 2008-309551, it is conventionally proposed to dim or quench a part of the projection pattern that causes multiple reflections on surfaces of an inspected object. More specifically, it is conventionally known to project two types of different projection patterns and obtain a three-dimensional shape based on each of these patterns. Then, if there is a significant difference between two three-dimensional measurement results in a target area, it can be determined that multiple reflections have occurred in this area. Further, the conventional method includes performing ray tracing to detect a surface on which multiple reflections occur, quenching a projection pattern portion that corresponds to the detected surface, and correcting the three-dimensional measurement result based on a captured image obtainable by projecting a newly quenched projection pattern on a measurement target object.

According to the method discussed in Japanese Patent Application Laid-Open No. 2008-309551, it is necessary to project the projection pattern multiple times to find out the projection pattern portion that causes multiple reflections although it is useful to dim or quench a part of the projection pattern. More specifically, information about the measurement target object is not available when the projection pattern is generated. Therefore, in an initial stage, the required number of pattern projections cannot be identified. Further, confirming whether an optimum projection pattern has been projected is difficult. Thus, it is required to perform determination at appropriate timing while continuously repeating the projection and imaging operations.

SUMMARY OF THE INVENTION

According to an aspect of the present invention, a distance measuring apparatus includes at least one projection unit configured to project a light pattern on a target object, at least one imaging unit configured to capture an image of the target object on which the light pattern is projected, an acquisition unit configured to acquire information about a distance from the projection unit or the imaging unit to the target object based on the image captured by the imaging unit, a grouping unit configured to group surfaces of the target object, and a determination unit configured to determine a light pattern to be projected by the projection unit based on the surfaces grouped by the grouping unit.

According to an exemplary embodiment of the present invention, it is feasible to reduce the number of imaging operations and suppress the influence of multiple reflections. Thus, highly accurate distance measurement can be realized.

Further features of the present invention will become apparent from the following description of exemplary embodiments with reference to the attached drawings.

DESCRIPTION OF THE EMBODIMENTS

Figure 1:
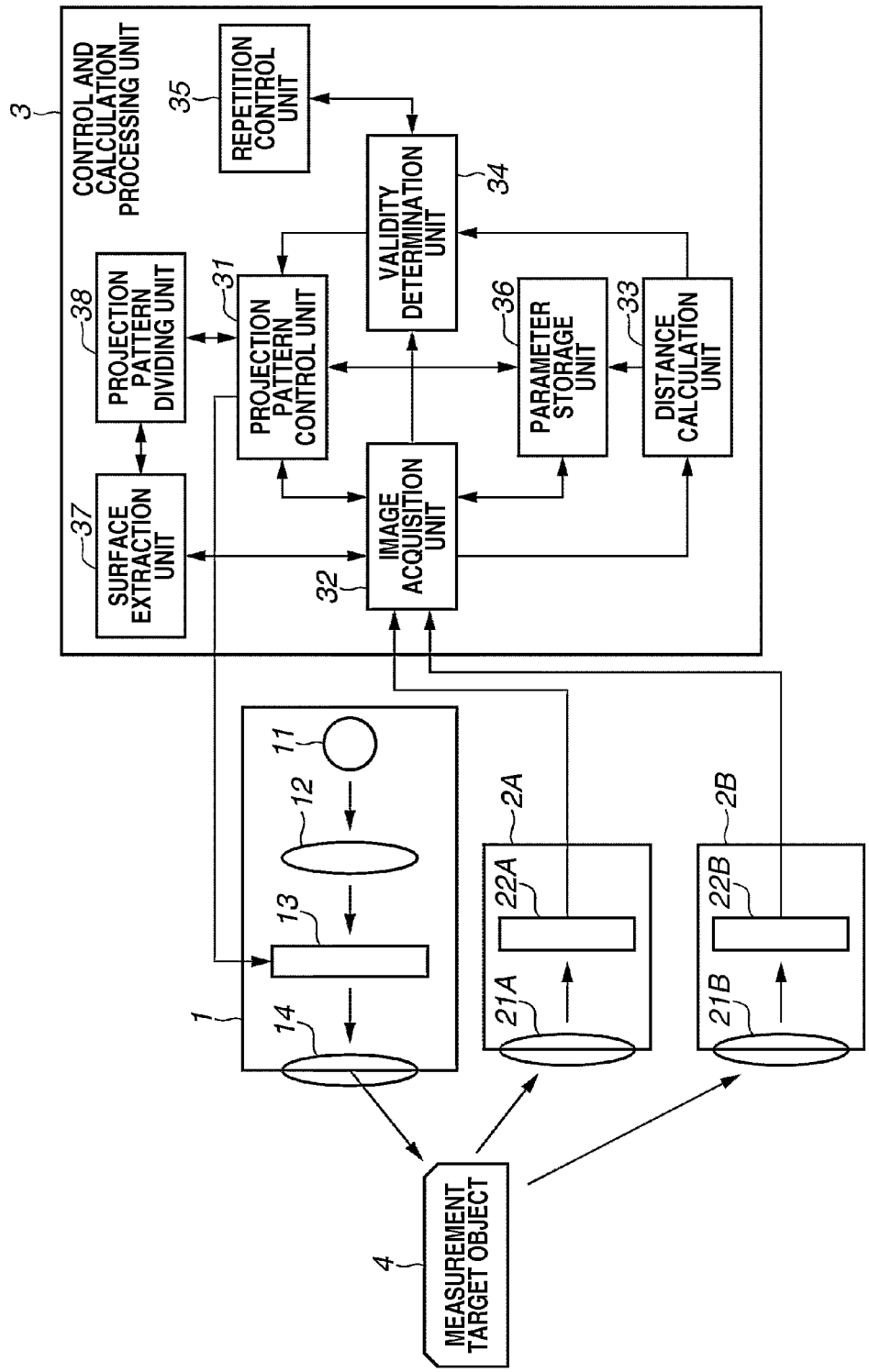
FIG. 1 illustrates a configuration example of a distance measuring apparatus according to a first exemplary embodiment.

A method according to a first exemplary embodiment includes initially acquiring a schematic shape of a measurement target object with a plurality of imaging units (e.g., cameras) according to a passive method and subsequently performing three-dimensional measurement of the measurement target object with a pattern projection unit (e.g., a projector) configured to project a measurement light pattern on the measurement target object and an imaging unit (e.g., a camera) configured to capture an image of the measurement target object on which the measurement light pattern is projected.

Employing the above-mentioned method is useful in that the adverse influence of multiple reflections can be suppressed because the passive method using a plurality of cameras does not include any pattern projection. Further, it is feasible to obtain the shape of the measurement target object based on an obtained distance measurement result.

However, distance image processing according to an active method using a combination of a camera and a projector is superior to the passive method in that it is easy to identify a feature point on the measurement target object and in that the accuracy is high. Therefore, it is useful to calculate a final measurement value based on distance measurement information obtained according to the active method.

A schematic shape acquisition method employed in the present exemplary embodiment is a stereo and passive method. However, another passive distance measurement method, such as Depth From Focus (DFF) method or Depth From Defocus (DFD) method, is employable. Further, a detailed shape acquisition method employed in the present exemplary embodiment is a stereo and active method. However, another method using a projection apparatus other than the projector (e.g., a laser apparatus) is usable.

Further, the method according to the present exemplary embodiment includes pre-stage processing that includes performing distance measurement according to the passive method, and dividing a projection pattern (i.e., a light pattern to be projected by the projector) into a plurality of patterns with reference to a schematic shape of the measurement target object and information about a normal line of an object surface, and further acquiring distance information based on the distance measurement using the divided projection pattern according to the active method.

In the first exemplary embodiment, two imaging units cooperatively constitute a stereo camera that can perform a distance imaging operation according to the passive method to acquire measurement target object distance data.

Next, the acquired measurement target object distance data is used to estimate the direction of a normal line of a surface that constitutes the measurement target object. Usually, the measurement target object distance data can be acquired as point group data. Therefore, the acquired point group data is used to estimate the state of a point group that constitutes a surface of the measurement target object. The point group data constituting a surface of the measurement target object is used to calculate a specific flat surface on which the distance from each point can be minimized to calculate the surface of the measurement target object.

After the surface of the measurement target object has been calculated, a vector vertical to the surface is obtained to set a normal line of the surface.

Next, the direction of the obtained normal line of the surface is used to calculate a reflection direction of light (measurement pattern) emitted from the projector on a measurement target object surface. Further, the normal line direction and camera arrangement information are used to divide the measurement target object surface into smaller surfaces that are regarded as being coincident with each other in the reflection direction of light.

Next, the surface division information is used to divide a projection pattern to be projected by the projector into a plurality of projection patterns. Then, the divided projection patterns are used to perform target object distance measurement according to the active method.

As mentioned above, by dividing a projection pattern and performing projection in such a way as to improve the situation to prevent multiple reflections from occurring with reference to the surface normal line information and camera arrangement information obtained in the distance measurement according to the passive method, before performing the distance measurement according to the active method, it is feasible to reduce the number of repetitively performed imaging operations in the three-dimensional measurement that reduces the influence of multiple reflections in the distance measurement according to the active method.

FIG. 1 illustrates a configuration example of a distance measuring apparatus according to the present exemplary embodiment. As illustrated in FIG. 1, the distance measuring apparatus according to the present exemplary embodiment includes a projection unit 1, two imaging units 2A and 2B, and a control and calculation processing unit 3.

The projection unit 1 is configured to project a light pattern (e.g., a line pattern) on a measurement target object 4. Each imaging unit 2 is configured to capture an image of the measurement target object 4 on which the light pattern is projected. The control and calculation processing unit 3 is configured to control the projection unit 1 and each imaging unit 2 and perform calculation processing based on captured image data to measure the distance from the measurement target object 4.

The projection unit 1 includes a light source 11, an illumination optical system 12, a display element 13, and a projection optical system 14. The light source 11 is an appropriate light emitting element (e.g., a halogen lamp or a light-emitting diode (LED)). The illumination optical system 12 is functionally operable to guide light, if it is emitted from the light source 11, to the display element 13. It is desired that the incident luminance is uniform when the light emitted from the light source 11 enters the display element 13. Therefore, an optical system having the capability of uniformizing the luminance (e.g., Koehler illumination or diffuser panel) is usable as the illumination optical system 12. The display element 13 is, for example, a transmissive liquid crystal display (LCD) or a reflective LCO step S•DMD. The display element 13 is functionally operable to spatially control the transmissivity or reflectance when the light is guided from the illumination optical system 12 to the projection optical system 14. The projection optical system 14 is an optical system that is configured to form an image of the display element 13 at a specific position of the measurement target object 4. A digital light processing (DLP) projector or a diffractive projector is usable as an example of the projection optical system that can satisfy the above-mentioned configuration. In present exemplary embodiment, the projection apparatus is not limited to the above-mentioned configuration including a display element and a projection optical system. For example, the projection apparatus can be configured to include a spotlight and a two-dimensional scanning optical system.

Each of the imaging units 2A and 2B includes an imaging lens 21 and an image sensor 22. The imaging lens 21 is an optical system configured to form an image of a specific portion of the measurement target object 4 on the image sensor 22. The image sensor 22 is an appropriate photoelectric conversion element, such as a complementary metal-oxide semiconductor (CMOS) sensor or a charged coupled device (CCD) sensor.

The control and calculation processing unit 3 includes a projection pattern control unit 31, an image acquisition unit 32, a distance calculation unit 33, a validity determination unit 34, a repetition control unit 35, and a parameter storage unit 36. A general computer (i.e., a hardware apparatus), which includes a central processing unit (CPU), a storage device (e.g., a memory and a hard disk), and an input/output interface, can constitute a hardware configuration of the control and calculation processing unit 3. A distance measurement program, which causes a computer to implement a distance measurement method according to the present invention, can constitute a software configuration of the control and calculation processing unit 3.

The CPU, when it executes the distance measurement program, is functionally operable as each of the projection pattern control unit 31, the image acquisition unit 32, the distance calculation unit 33, the validity determination unit 34, the repetition control unit 35, and the parameter storage unit 36.

The projection pattern control unit 31 is configured to generate projection patterns as described below and stores the generated projection patterns in the storage apparatus beforehand. Further, if necessary, the projection pattern control unit 31 reads projection pattern data and validity determination results, as described below, from the storage device and transmits the projection pattern data to the projection unit 1 via a general display interface (e.g., a digital visual interface DVI). Further, the projection pattern control unit 31 is functionally operable to control operations to be performed by the projection unit 1 via a general communication interface (e.g., RS232C or IEEE488). The projection unit 1 can display a projection pattern on the display element 13 based on the received projection pattern data. An example of the measurement pattern to be projected on the display element 13 is a gray code according to the space coding method or a sine wave pattern according to the phase shift method.

The image acquisition unit 32 is configured to acquire a digital image signal having been sampled and quantized by each imaging unit 2. Further, the image acquisition unit 32 is functionally operable to acquire image data represented by the luminance (density value) of each pixel from the acquired image signal and store the acquired image data in a memory. The image acquisition unit 32 is functionally operable to control operations (including image capturing time control) to be performed by the imaging unit 2 via a general communication interface (e.g., R step S232C or IEEE488).

The image acquisition unit 32 and the projection pattern control unit 31 can perform operations in cooperation with each other. If the pattern display on the display element 13 is completed, the projection pattern control unit 31 transmits a pattern display completion signal to the image acquisition unit 32. If the image acquisition unit 32 receives the pattern display completion signal from the projection pattern control unit 31, the image acquisition unit 32 causes each imaging unit 2 to operate in such a way as to capture an image. If the image capturing is completed, the image acquisition unit 32 transmits an image capturing completion signal to the projection pattern control unit 31. If the projection pattern control unit 31 receives the image capturing completion signal from the image acquisition unit 32, the projection pattern control unit 31 switches the projection pattern to be displayed on the display element 13 to the next projection pattern. The control and calculation processing unit 3 repeats the above-mentioned operations to successively capture images of all projection patterns.

The distance calculation unit 33 is configured to calculate the distance from the projection unit 1 or the imaging unit 2A (or 2B) to the measurement target object 4 based on the captured images of the distance measurement patterns and parameters stored in the parameter storage unit 36 for each pixel of the display element 13 or the image sensor 22. The distance measurement is performed for each pixel of the projection unit 1. Therefore, the validity determination is performed on a pixel-by-pixel basis. In the present exemplary embodiment, the distance calculation unit 33 determines validity of the distance measurement value of the measurement target object 4 for each pixel of the display element 13 of the projection unit 1. However, the present invention is not limited to the above-mentioned example. For example, the distance calculation unit 33 can perform the target object distance measurement value validity determination processing for every predetermined number of pixels of the display element 13 of the projection unit 1. Further, the distance calculation unit 33 can determine validity of the distance measurement value of the measurement target object 4 for each pixel or a plurality of pixels of the display element 13 of the imaging unit 2.

Further, the system according to the present exemplary embodiment performs quenching or dimming for each pixel constituting the display element 13 of the projection unit 1 that corresponds to the area having been determined as being valid. However, the present invention is not limited to the above-mentioned example. For example, the system according to the present exemplary embodiment can perform quenching or dimming for a plurality of pixels constituting the display element 13 of the projection unit 1.

The validity determination unit 34 is configured to determine validity (i.e., determine whether the distance is accurate and reliable) for each area. In the present exemplary embodiment and another exemplary embodiment, the area is the concept including each pixel and a plurality of pixels. The validity determination unit 34 transmits the obtained validity determination result to the parameter storage unit 36 and updates the pattern to be projected based on the validity determination result.

The repetition control unit 35 is configured to perform sequential processing including projecting a pattern on the measurement target object 4, calculating the distance to the measurement target object 4 based on an imaged result, determining validity of the distance calculation result, and updating the projection pattern based on the determined validity, and is configured to repeat the above-mentioned sequential processing until a predetermined completion condition is satisfied. In the first exemplary embodiment, the repetition control unit 35 terminates the above-mentioned sequential processing when the number of repetitions reaches a value arbitrarily designated by a user.

The parameter storage unit 36 is configured to store parameters that are necessary to calculate a three-dimensional distance. The parameters stored in the parameter storage unit 36 include device parameters relating to the projection unit 1 and the imaging units 2A and 2B, internal parameters relating to the projection unit 1 and the imaging units 2A and 2B, external parameters relating to the projection unit 1 and the imaging units 2A and 2B, and parameters relating to the projection patterns. Further, the parameter storage unit 36 can store a validity determination result obtained by the validity determination unit 34. The validity determination result can be used when the projection pattern control unit 31 updates the projection pattern.

The device parameters relating to the projection unit 1 and the imaging units 2A and 2B include the number of pixels that constitute the display element 13 and the number of pixels that constitute the image sensor 22. The internal parameters relating to the projection unit 1 and the imaging units 2A and 2B include focal length, image center, and image distortion coefficient. The external parameters relating to the projection unit 1 and the imaging units 2A and 2B include a translation matrix and a rotation matrix that express a relative positional relationship between the projection unit 1 and the imaging units 2A and 2B. The parameters relating to the projection patterns include information about distance measurement patterns and quenching/dimming mask patterns. The validity determination result is data indicating whether an area (e.g., each pixel or a plurality of pixels) of the image sensor 22 or the display element 13 is valid or invalid.

The control and calculation processing unit 3 further includes a surface extraction unit 37 configured to receive images captured by the imaging unit 2A and the imaging unit 2B from the image acquisition unit 32 and perform stereo distance measurement based on the received images according to the passive method. The surface extraction unit 37 is further configured to estimate a surface of the measurement target object 4 based on the obtained distance data and calculate a normal line direction of the estimated surface of the measurement target object 4. In the present exemplary embodiment, the surface extraction unit 37 employs the passive method to perform the distance measurement. However, any other distance measurement method is usable if it is free from the influence of multiple reflections.

The surface extraction unit 37 calculates a reflected light direction at each point on respective surfaces based on geometrical layout information about the projection unit 1 and the imaging units 2A and 2B. The surface extraction unit 37 determines whether the reflected light direction is within a predetermined range and classifies the surfaces with reference to the range.

The control and calculation processing unit 3 further includes a projection pattern dividing unit 38 configured to acquire a group of surfaces that are estimated as being less influenced by reflections and can be imaged simultaneously, from the surfaces initially calculated by the surface extraction unit 37.

Figure 2:
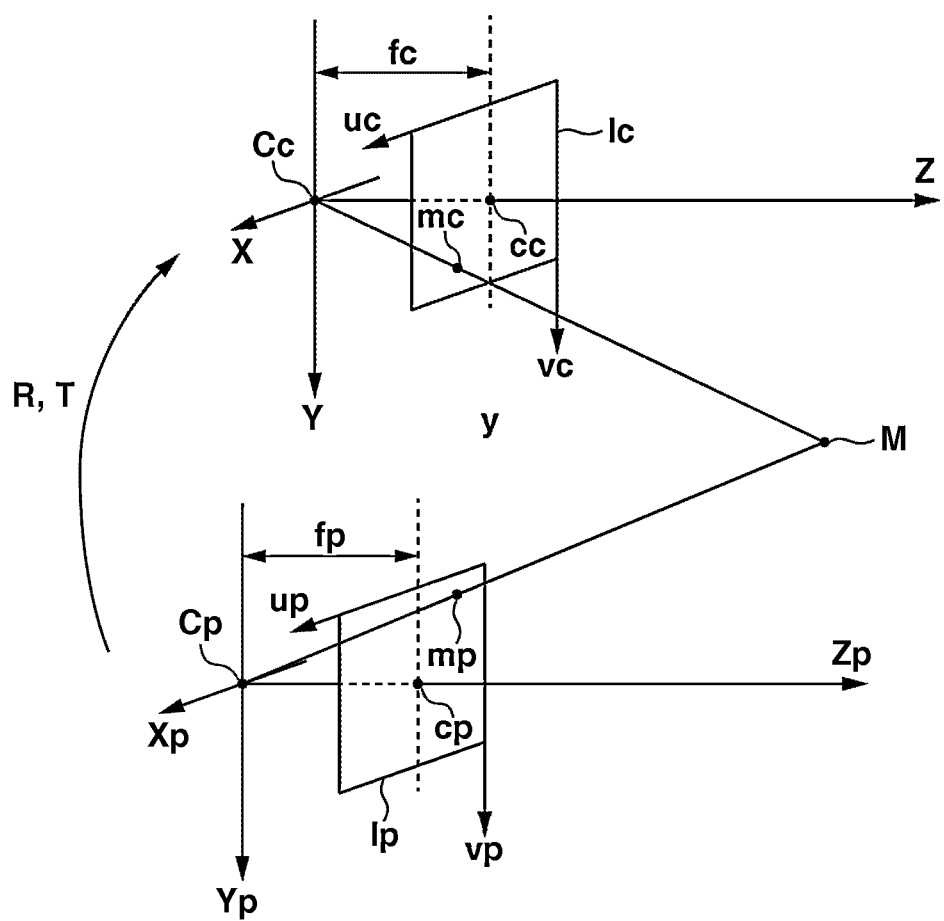
FIG. 2 illustrates the principle of triangulation.

The projection pattern dividing unit 38 calculates a corresponding position of a projection pattern projected by the projection unit 1 based on the position of a plurality of surface groups having been obtained as mentioned above on the image sensor 22 of the imaging unit 2, with reference to the geometrical layout information about the projection unit 1 and the imaging units 2A and 2B. Then, the projection pattern dividing unit 38 determines lighting or quenching of the projection pattern. The principle of distance measurement according to the triangulation method is described in detail below with reference to FIG. 2. When Cc represents the lens center of the imaging unit 2, Ic represents the image plane, fc represents the focal length, (uco, vco) represents the pixel coordinates of an image center cc, and PSc represents the pixel size of the image sensor 22, an internal matrix Ac of the imaging unit 2 can be expressed using the following formula (1).

$$Ac = \begin{bmatrix} fc/Psc & 0 & uco \\ 0 & fc/Psc & vco \\ 0 & 0 & 1 \end{bmatrix} \quad (1)$$

Further, when Cp represents the lens center of the projection unit 1, Ip represents the image plane, fp represents the focal length, (upo, vpo) represents the pixel coordinates of an image center cp, and PSp represents the pixel size of the display element 13, an internal matrix Ap of the projection unit 1 can be expressed using the following formula (2).

$$Ap = \begin{bmatrix} fp/Psp & 0 & uco \\ 0 & fp/Psp & vco \\ 0 & 0 & 1 \end{bmatrix} \quad (2)$$

The internal matrix Ac of the imaging unit 2 and the internal matrix Ap of the projection unit 1 can be calculated according to a well-known internal parameter calibration method.

A rotation matrix R and a translation matrix T are external parameters representing the relative positional relationship between a camera coordinate system XYZ of the imaging unit 2 and a camera coordinate system XpYpZp of the projection unit 1. The rotation matrix R is a 3×3 matrix and the translation matrix T is a 3×1 matrix. The rotation matrix R and the translation matrix T can be calculated according to a well-known external parameter calibration method.

Further, (X,Y,Z) represents the coordinates of a point M in a three-dimensional space having an origin that corresponds to the camera coordinate system of the imaging unit 2, and (uc,vc) represents the pixel coordinates of a projected point mc of the point M projected on the image plane Ic of the imaging unit 2. The corresponding relation can be expressed using the following formula (3).

$$s \begin{bmatrix} uc \\ vc \\ 1 \end{bmatrix} = [Ac \; 0] \begin{bmatrix} X \\ Y \\ Z \\ 1 \end{bmatrix} = \begin{bmatrix} C_{11} & C_{12} & C_{13} & C_{14} \\ C_{21} & C_{22} & C_{23} & C_{24} \\ C_{31} & C_{32} & C_{33} & C_{34} \end{bmatrix} \begin{bmatrix} X \\ Y \\ Z \\ 1 \end{bmatrix} \quad (3)$$

S represents scalar. Further, (up,vp) represents the pixel coordinates of a projected point mp of the point M projected on the image plane Ip of the projection unit 1. The corresponding relation can be expressed using the following formula (4).

$$s' \begin{bmatrix} up \\ vp \\ 1 \end{bmatrix} = \begin{bmatrix} R & T \\ 0 & 1 \end{bmatrix} [Ap \; 0] \begin{bmatrix} X \\ Y \\ Z \\ 1 \end{bmatrix} = \begin{bmatrix} P_{11} & P_{12} & P_{13} & P_{14} \\ P_{21} & P_{22} & P_{23} & P_{24} \\ P_{31} & P_{32} & P_{33} & P_{34} \end{bmatrix} \begin{bmatrix} X \\ Y \\ Z \\ 1 \end{bmatrix} \quad (4)$$

S' represents scalar. The following formula (5) including four simultaneous equations can be derived from formula (3) and formula (4).

$$\left.\begin{aligned}(C_{11}-C_{31}uc)X+(C_{12}-C_{32}uc)Y+(C_{13}-C_{33}uc)Z &= C_{34}uc-C_{14}\\(C_{21}-C_{31}vc)X+(C_{22}-C_{32}vc)Y+(C_{23}-C_{33}vc)Z &= C_{34}vc-C_{24}\\(P_{11}-P_{31}up)X+(P_{12}-P_{32}up)Y+(P_{13}-P_{33}up)Z &= P_{34}up-P_{14}\\(P_{21}-P_{31}vp)X+(P_{22}-P_{32}vp)Y+(P_{23}-P_{33}vp)Z &= P_{34}vp-P_{24}\end{aligned}\right\} \quad (5)$$

The pixel coordinates (uc,vc) of the point mc and the pixel coordinates (up,vp) of the point mp can be obtained according to an appropriate pattern projection method (e.g., the method described in the background art). Further, Cij (i=1 to 3 and j=1 to 4) and Pij (i=1 to 3 and j=1 to 4) can be calculated using internal matrices and external parameters and, therefore, can be obtained beforehand based on calibration. In formula (5), only the coordinates (X, Y, Z) of the point M are unknown quantity. Therefore, the coordinates (X, Y, Z) of the point M can be obtained by solving the simultaneous equations. When three coordinate values X, Y, and Z of the point M are unknown, it is feasible to calculate all of the coordinate values of the point M by obtaining either one of the pixel coordinate values up and vp of the projection unit 1. As mentioned above, the distance measurement can be implemented according to the triangulation method.

In the present exemplary embodiment, each of the projection unit 1 and the imaging units 2A and 2B is described using a pinhole camera model. However, the camera model to which the present invention is applied is not limited to the pinhole camera.

In the first exemplary embodiment, the number of cameras (i.e., the imaging units) is two. The distance measurement is performed for each of the projection unit 1 and the imaging units 2A and 2B according to the above-mentioned triangulation method. Further, it is feasible to measure the distance between the imaging unit 2A and the imaging unit 2B according to the triangulation method, referring to a relation relative to the pixel coordinates of another imaging unit, instead of referring to the pixel coordinates (up,vp) of the point mp that corresponds to the projection unit 1. Therefore, it is feasible to obtain three distance measurement results about the first distance between the projection unit 1 and the imaging unit 2A, the second distance between the projection unit 1 and the imaging unit 2B, and the third distance between the imaging unit 2A and the imaging unit 2B. However, the pixel correspondence relationship between two imaging units can be acquired indirectly, for example, with reference to the relationship between each imaging unit and the projection unit 1. Further, an appropriate twin-lens stereo matching method (e.g., the method discussed in the following literature) is employable to obtain the relationship between the imaging units 2A and 2B.

D. Scharstein and R. Szeliski, "A taxonomy and evaluation of dense two-frame stereo correspondence algorithms," IJCV, vol. 47, no. 1, 2002

Figure 3:
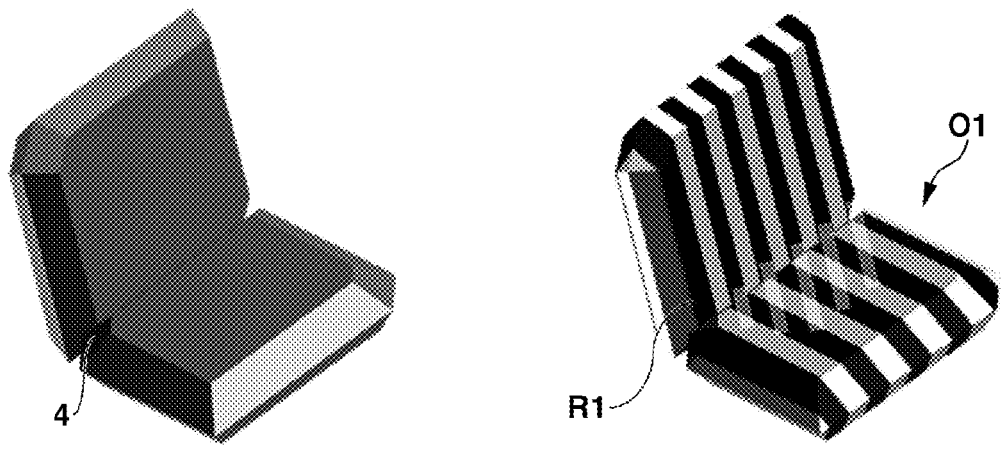
FIG. 3 illustrates an example of multiple reflections.
Figure 3:
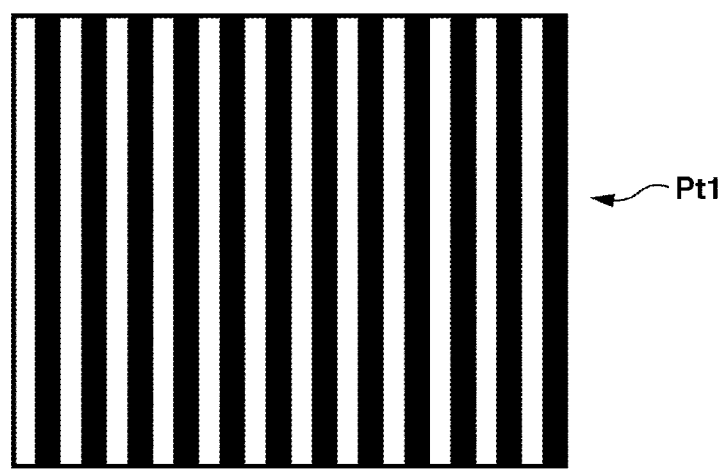

In a case where the light does not cause any multiple reflection or if the influence is not actualized even when multiple reflections occur, it is useful to measure the distance from the measurement target object 4 according to the above-mentioned triangulation method. However, a significant measurement error occurs when the influence is actualized by the generated multiple reflections of light. For example, in a case where a light pattern Pt1 is projected on the measurement target object 4 as illustrated in FIG. 3, an image O1 of the measurement target object 4 includes a portion R1 influenced by multiple reflections when it is captured by the imaging unit 2.

Figure 4:
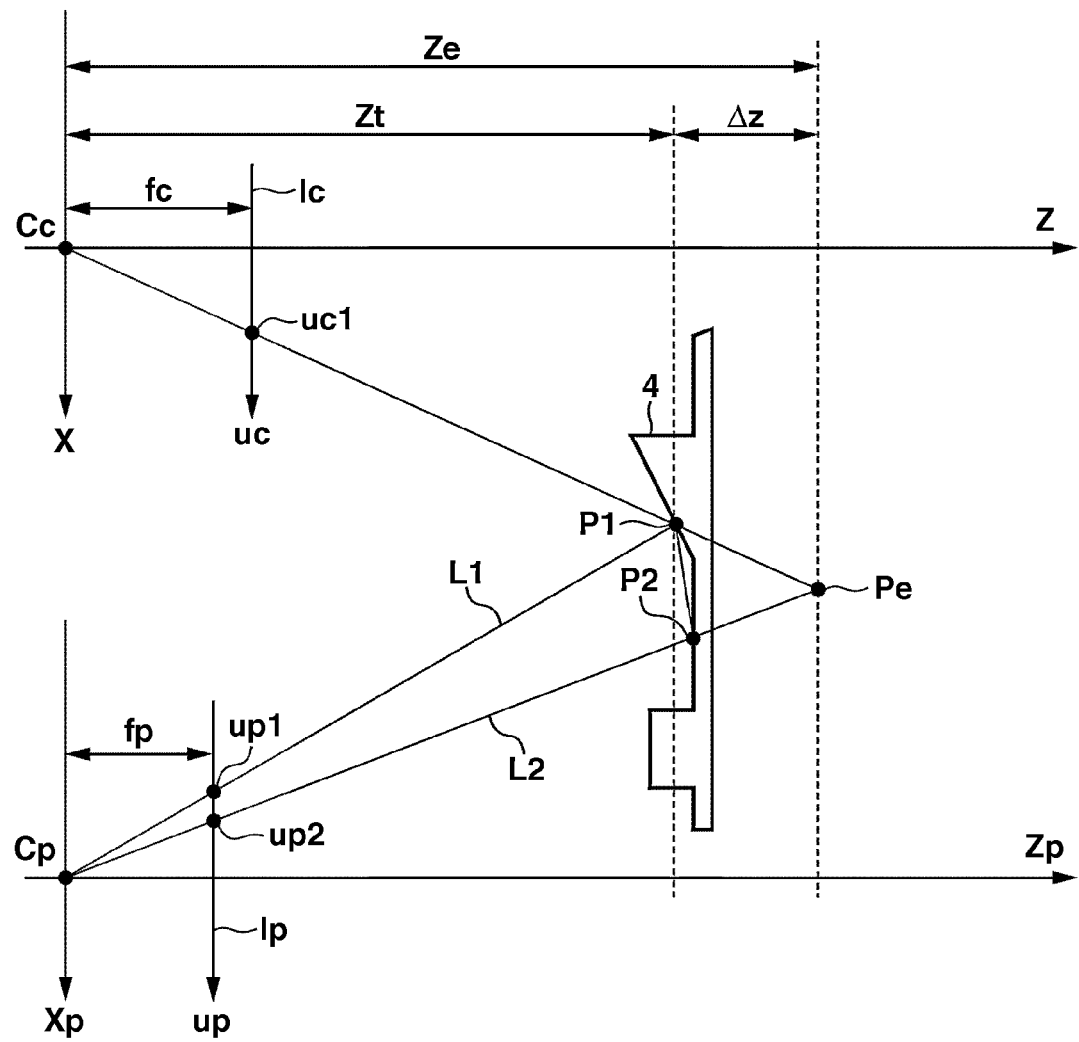
FIG. 4 illustrates details about multiple reflections.

A measurement error occurrence mechanism in the situation that multiple reflections of light occur is described below with reference to FIG. 4. FIG. 4 is a cross-sectional view illustrating a two-dimensional layout defined using the X axis and the Z axis to simplify the description.

A light beam L1 emitted from the lens center Cp of the projection unit 1 travels in a direction passing through a point up1 on the image plane Ip and reaches a point P1 on the measurement target object 4. Then, the light reflected at the point P1 intersects with the image coordinate plane of the imaging unit 2 at a point uc1 and reaches the lens center Cc of the imaging unit 2.

A light beam L2 emitted from the lens center Cp of the projection unit 1 travels in a direction passing through a point up2 on the image plane Ip and reaches a point P2 on the measurement target object 4. Then, the light reflected at the point P2 is secondarily reflected at the point P1. Subsequently, the secondarily reflected light intersects with the image coordinate plane of the imaging unit 2 at the point uc1 and reaches the lens center Cc of the imaging unit 2. In the case where the secondary reflection occurs, the light emitted from the lens center Cp of the projection unit 1 behaves as if the light were emitted from the point P2.

In a case where the multiple reflections are less influential because the glossiness of the measurement target object 4 is lower, the reflected light L1 becomes dominant when the luminance is observed by the imaging unit 2. Therefore, the pixel coordinate value (i.e., the point up1) can be accurately detected. Therefore, an accurate distance measurement result Zt can be acquired.

On the other hand, in a case where the multiple reflections are greatly influential because the glossiness of the measurement target object 4 is higher and the reflected light is observed in the regular reflection, in which the reflection angle becomes equal to the incident angle, the reflected light L2 becomes dominant. In this case, the pixel coordinate value (i.e., the point up2) is erroneously detected. In other words, a measuring point Pe is erroneously measured and a distance measurement result Ze is acquired. As a result, the measurement causes an error $\Delta Z$ (=Zt−Ze).

In practice, not only the secondarily reflected light illustrated in FIG. 4 but also tertiary or more higher-order reflected light may occur. Thus, measurement errors may become more complicated. In this manner, multiple reflections of light cause measurement errors according to the above-mentioned mechanism.

In view of the foregoing, the system according to the present exemplary embodiment quenches or dims a projection pattern portion that corresponds to an area determined as being valid, when designated by the validity determination unit 34 because it is not influenced by the multiple reflections. Further, the system according to the present exemplary embodiment repetitively performs sequential processing including projection, imaging, distance measurement, and determination with an updated pattern, thereby enlarging an area in which the measurement can be accurately performed while suppressing generation of multiple reflections.

Figure 5:
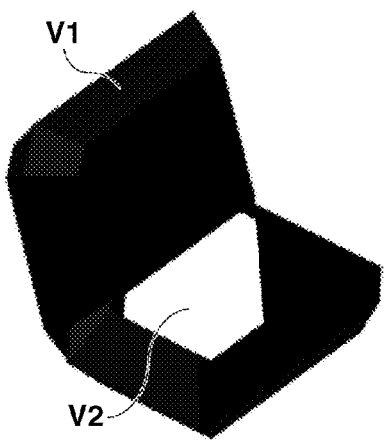
FIG. 5 illustrates an updated projection pattern.
Figure 5:
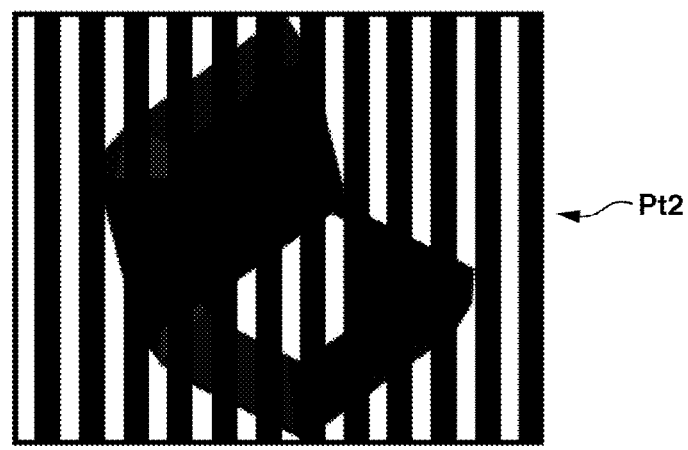
Figure 5:
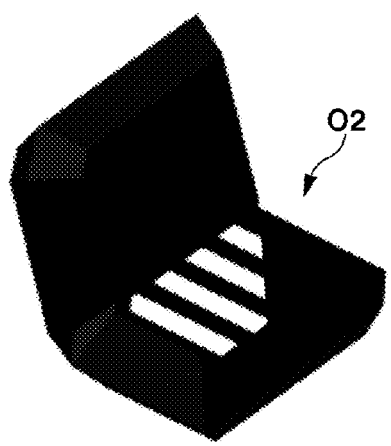

FIG. 5 illustrates an example of a projection pattern including a quenched part, in which V1 represents an area determined as being valid by the validity determination unit 34 when the three-dimensional measurement is performed using the observation image O1 illustrated in FIG. 3. On the other hand, V2 represents an area determined as being invalid due to the influence of multiple reflections. The projection pattern updating processing includes acquiring an updated pattern Pt2 illustrated in FIG. 5 by quenching or dimming the area V1 (i.e., the area determined as being valid) of the measurement target object 4 from the pattern Pt1 illustrated in FIG. 3. An observation image O2 can be obtained when the projection and imaging processing is performed again with the updated projection pattern group Pt2. As a result, it becomes feasible to realize a three-dimensional measurement without being substantially influenced by multiple reflections.

Example processing according to the first exemplary embodiment, including division of a projection pattern to be performed taking the influence of multiple reflections into consideration and measurement of a multiple reflection area, is described in detail below with reference to a flowchart illustrated in FIG. 6.

First, projection pattern division processing is described.

In step S1, each of the imaging unit 2A and the imaging unit 2B captures a visible image. In the initial imaging stage, the projection unit 1 does not project any projection pattern. Alternatively, any type of non-pattern illumination is usable if the luminance value of each pixel of the projector is the same. Further, as illustrated in FIG. 1, the imaging operation is performed using two imaging units, although three or more imaging units are usable. In this case, the number of visible images to be captured is two or more. However, the system performs substantially the same processing even when three or more visible images are obtained. Therefore, in the following description, the imaging units are described as being configured to acquire only two visible images. The captured visible images are transmitted to the surface extraction unit 37 via the image acquisition unit 32.

In step S2, the surface extraction unit 37 performs distance measurement processing based on two visible images captured by the imaging unit 2A and the imaging unit 2B according to a passive stereo method.

The passive stereo method employed in the present exemplary embodiment includes pattern matching applied to a local block to perform distance measurement. However, any other distance calculation algorithm according to the passive stereo method is employable if it is useful to calculate distance values. Another method (e.g., depth of defocus (DFD) method), if it can measure the distance according to a passive method not using any measurement pattern similar to the present exemplary embodiment, is usable.

When the above-mentioned three-dimensional imaging processing according to the passive method is performed, it becomes feasible to calculate a distance value for each element in a feature quantity existing portion of a visible image. This is a characteristic feature of the three-dimensional imaging processing according to the passive method. Therefore, the region where the distance calculation value is obtainable is limited to only the feature quantity existing portion (e.g., an edge portion of a measurement target object). Thus, when an optimization method (e.g., graph cut method) is supplementarily used, it becomes feasible to obtain an estimated distance value for a feature quantity non-existing portion.

However, the distance value obtainable for a feature quantity non-existing portion is an estimated value (i.e., a distance value whose accuracy is not assured), although the shape of the measurement target object 4 can be roughly known.

Next, in step S3, the surface extraction unit 37 performs surface extraction processing. The surface extraction processing includes identifying partial areas of the shape of the measurement target object 4 obtained in step S2, if these areas are similar in inclination, and extracting a surface area of the measurement target object 4 by grouping the identified areas. The region to be extracted can be arbitrarily determined. In the present exemplary embodiment, the surface extraction unit 37 refers to the inclination of each surface of the measurement target object. The obtained inclination values can be used to perform division processing through labeling processing. Further, it is useful to perform division processing using smaller surfaces that are referred to as super pixels.

Any one of the above-mentioned methods is employable to obtain smaller surfaces that are similar in inclination. When calculating the inclination of each surface is feasible, calculating an average normal line direction of each surface is feasible. Detailed technical information about the super pixel is, for example, discussed in the following literature.

SLIC Superpixels Compared to State-of-the-art Superpixel Methods IEEE Transactions on Pattern Analysis and Machine Intelligence (ISSN: 0162-8828) Institute of Electrical and Electronics Engineers, 2012

Next, in step S4, the surface extraction unit 37 calculates the direction of light reflected on each extracted surface of the measurement target object (i.e., predicts how the projection pattern of the projection unit 1 reflects). The reflected light direction can be determined using geometrical layout information about the projection unit 1, the imaging unit 2A, and the imaging unit 2B when the normal line direction of each surface is known, as described in detail below. Calculating the reflected light direction on each surface is feasible in step S4.

Next, in step S5, the surface extraction unit 37 determines a combination of surfaces that can be simultaneously illuminated based on grouping of reflected light directions on respective surfaces calculated in step S4. The surface extraction unit 37 generates projection patterns of respective groups. There is a higher possibility that multiple reflections occur between surfaces if vectors representing the directions of light reflected thereon are less than a predetermined threshold value. The above-mentioned grouping is performed in such a way as to remove the occurrence of multiple reflections as described in detail with reference to FIG. 10.

Figure 7:
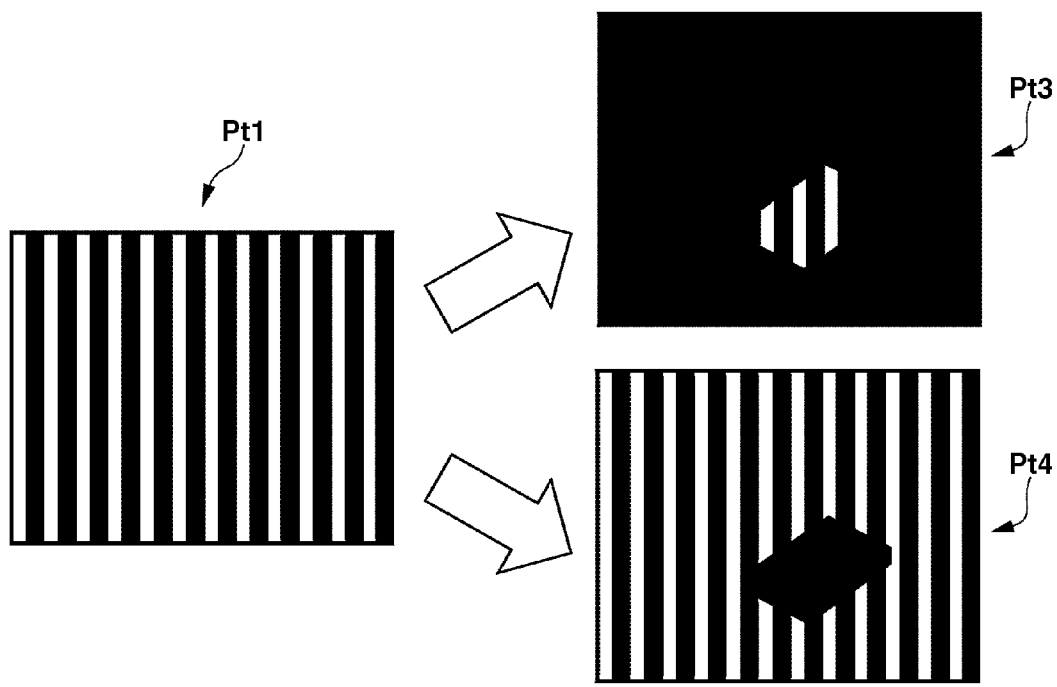
FIG. 7 illustrates an example division of a projection pattern.

As a result, each surface extracted in step S3 is allocated in such a way as to belong to one of a plurality of groups. The position of the measurement target object 4 on a visible image (i.e., a coordinate position on the camera screen) can be correlated with a position on the projection pattern (i.e., a coordinate position on the projector screen), with reference to the camera-projector geometric relationship calculation method illustrated in FIG. 5. Therefore, it is feasible to generate a corresponding projection pattern for each group of surfaces of the measurement target object 4. FIG. 7 illustrates two divided patterns Pt3 and Pt4 obtainable from the pattern Pt1.

The generated projection patterns Pt3 and Pt4 are usable to perform distance measurement in step S6 to step S10.

Next, processing to be performed in steps S6 to step S10 (i.e., distance measurement steps) is described in detail below.

In step S6, the projection unit 1 projects a measurement pattern group on the measurement target object 4 and each of the imaging unit 2A and the imaging unit 2B captures an image of the measurement target object 4 together with the pattern projected thereon. If each imaging unit completes the image capturing processing, the projection unit 1 projects the next measurement pattern group and each imaging unit captures an image of the measurement target object 4 together with the pattern projected thereon. The distance measuring apparatus repeats the above-mentioned operations until the projection and imaging processing completes for all of the measurement pattern groups. The measurement pattern usable in this step is, for example, a gray code although any other appropriate pattern is usable. The captured image data is transmitted to the image acquisition unit 32.

In step S7, the distance calculation unit 33 performs distance calculation based on the captured images according to the above-mentioned triangulation method, for each area, to obtain three distance measurement results about the first distance between the projection unit 1 and the imaging unit 2A, the second distance between the projection unit 1 and the imaging unit 2B, and the first distance between the imaging unit 2A and the imaging unit 2B.

In step S8, the validity determination unit 34 determines whether the distance measurement results are valid in each area based on three distance measurement results obtained in step S7. If coincidence is confirmed in each area with respect to the above-mentioned three distance measurement values, it can be determined that valid distance measurement results have been obtained without being influenced by multiple reflections. More specifically, if the measurement target object is glossy, the influence of multiple reflections is variable depending on the observation direction (i.e., the point of view). Therefore, the presence (i.e., influence) of multiple reflections can be known when the measurement target object is observed (from a different point of view) by another imaging unit. Further, in a case where coincidence is not confirmed due to other influence (e.g., image noises occurring at random) with respect to three distance measurement values, the obtained distance measurement results can be regarded as being invalid.

However, even in a state where there is not any influence caused by multiple reflections and image noises, distance measurement values obtained by a plurality of distance measurement systems may not have any perfect coincidence. If the actual state differs from an ideal state (i.e., a simulation), internal/external parameters obtained beforehand by calibration for the projection unit 1 and the imaging unit 2 may include tiny errors. The internal/external parameters for the projection unit 1 and the imaging unit 2 are used in calculating distance values as mentioned above according to the above-mentioned principle of triangulation. Therefore, errors if contained in the internal/external parameters appear as errors in obtained distance measurement values.

In general, it is difficult to remove or correct a calibration error unless the calibration is newly performed. Therefore, in a case where a calibration error causes a discordance between distance measurement values obtained by a plurality of distance measurement systems, it is useful to designate the position and orientation of a specific projection unit and a specific imaging unit (e.g., the projection unit 1 and the imaging unit 2A) as a calibration standard and set a permissible range. Although the above-mentioned standard may differ from true values, removing or correcting the calibration error is difficult. Therefore, the above-mentioned method for determining coincidence/discordance between distance measurement values is believed to be appropriate. More specifically, the method includes performing projection again for calibration data using the obtained internal/external parameters, calculating an error in a distance measurement result obtained by the calibration, and determining a permissible range from the standard (i.e., the range in which the distance measurement values can be regarded as being coincident with each other) based on the calculated error. Further, in this case, the distance from the area cannot be fixed to only one measurement value. Therefore, it is useful to designate values in a reference system as representative values. However, the method is not limited to the above-mentioned example. Another method using a mean value or a median as a representative value is employable.

In step S9, the projection pattern control unit 31 updates the projection pattern group in such a way as to quench or dim a portion corresponding to the area regarded as being valid with respect to the distance measurement value, of the projection pattern, based on the validity determination result obtained in step S8. The area regarded as being valid with respect to the distance measurement values is an area in which desired distance measurement values can be obtained. In other words, repetitively performing the distance measuring processing for the above-mentioned area is unnecessary. The distance measuring apparatus quenches or dims the light pattern that is projected on the above-mentioned area. In a case where the light pattern reflected on the above-mentioned area causes multiple reflections (namely, illuminates another surface of the measuring target object), removing adverse influence that may be caused by multiple reflections is feasible by projecting an updated projection pattern in the next repetitive processing. However, the projection pattern updating method is not limited to the quenching or dimming processing. Any other method for relatively reducing the influence of light that illuminates the area regarded as being valid is employable. For example, it is useful to brighten a projection pattern portion that corresponds to an area regarded as being not valid.

If the above-mentioned processing in step S1 through step S9 has been thoroughly performed, then in step S10, it is determined whether a predetermined completion determination condition is satisfied. If it is determined that the completion determination condition is satisfied (YES in step S10), the operation proceeds to step S11. If it is determined that the completion determination condition is satisfied (NO in step S10), the operation returns to step S6. The distance measuring apparatus repeats the processing at least one time using the projection pattern updated in step S9. In the first exemplary embodiment, it is presumed that the completion determination condition is "repeating the processing N times (N is an arbitrarily designate number of times)." Accordingly, if it is determined that the number of repetitions is equal to or less than N−1, the operation returns to step S6. If it is determined that the number of repetitions is equal to N, the operation proceeds to step S11. Performing the repetitive processing multiple times is effective to remove the influence of tertiary or more higher-order reflections or reduce the influence of image noises. Further, the number of repetitions can be arbitrarily designated. Thus, the distance measuring apparatus can perform processing according to actual cycle time.

The completion determination condition is not limited to the above-mentioned "repeating the processing the predetermined number of times." For example, it is useful to perform the completion determination processing based on the time required for the sequential processing. Further, it is useful to perform the completion determination processing based on processing results in steps S1005 and S1006. Further, it is useful to perform the completion determination processing based on a past measurement result and the latest measurement result.

When the operation returns to step S6, the distance measuring apparatus repeats the above-mentioned sequential processing (see steps S6 to S9) including projecting the projection pattern group updated in step S9 and capturing an image of the updated pattern group. Then, in step S10, the distance measuring apparatus determines whether the completion determination condition is satisfied. The distance measuring apparatus repeats the above-mentioned processing until the completion determination condition is satisfied.

In step S11, the distance measuring apparatus integrates distance measurement results. While performing the repetitive processing, the distance measuring apparatus stores a distance measurement value obtained in each area if the area is newly regarded as being valid. If the area is once regarded as being valid, the distance measuring apparatus stores the obtained distance measurement value while associating it with the area and no longer designates the area as a target to be subjected to the repetitive processing. Accordingly, if an area is newly regarded as being valid in the i-th repetitive processing, the distance measuring apparatus stores a distance measurement value obtained in this area. Then, in step S11, the distance measuring apparatus obtains a distance measurement result with respect to the measurement target object by integrating N pieces of distance measurement result data. However, the present invention is not limited to the above-mentioned example. For example, it is useful that the distance measuring apparatus adds a distance measurement value, if it is detected in an area newly regarded as being valid, to the distance measurement result data at appropriate timing (e.g., at processing timing of step S10) during the repetitive processing. In this case, the distance measurement result is already integrated at the time when the operation proceeds to step S11.

The distance measurement value of the measurement target object 4 can be finally acquired by integrating distance measurement results of respective projection patterns in the processing performed in step S11.

Next, a divisional pattern projection is described schematically.

The division of a projection pattern is useful to accomplish the distance measurement with a smaller number of repetitive imaging operations. The method includes calculating the influence of multiple reflections based on surface information of a measurement target object obtained beforehand and arrangement information of the camera and the projector about a portion that is influenced by the multiple reflections as described with reference to FIGS. 5 and 6, calculating a combination of surfaces that are less influenced by the multiple reflections, dividing the projection pattern into a plurality of patterns, and implementing the flowchart illustrated in FIG. 6.

In FIG. 7, if the influence of multiple reflections is measured and calculated beforehand for each surface, projection patterns that are robust against multiple reflections can be generated when the projection pattern Pt1 is divided into two projection patterns Pt3 and Pt4. However, it is necessary to perform the measurement of Pt3 and Pt4 in a time-divisional fashion. However, reducing the processing burden in steps S8 and S9 is feasible by generating a projection pattern considering the influence of multiple reflections beforehand. Further, the completion determination condition in step S10 can be satisfied at early timing. As a result, it becomes feasible to reduce the number of repetitions in the pattern projection and distance measurement processing in the flowchart illustrated in FIG. 6.

According to the example illustrated in FIG. 7, the projection pattern is divided into two projection patterns. However, the projection pattern can be divided into three or more projection patterns. The above-mentioned method is applicable to a distance measurement to be performed according to an appropriate active method (e.g., the space coding method or the phase shift method).

Next, a method for calculating the reflected light direction in step S10 and a method for grouping surfaces in step S11 are described in detail below with reference to FIG. 8 through FIG. 12.

Figure 8:
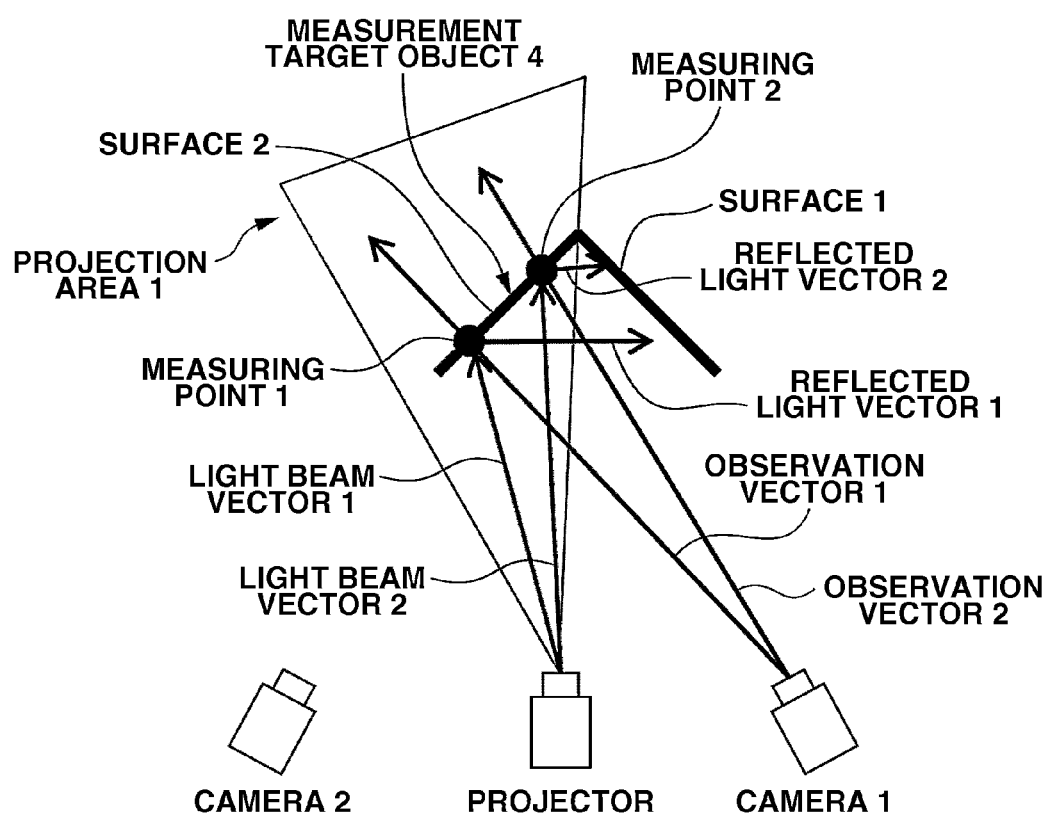
FIG. 8 illustrates smaller surfaces (i.e., similar reflection surfaces).

FIG. 8 illustrates calculation of smaller surfaces. Although the phenomenon of multiple reflections has been described with reference to FIG. 4, preprocessing required in grouping smaller surfaces is described below. The preprocessing includes acquiring smaller surfaces that can be regarded as being coincident with each other in the reflection direction of a measurement light beam. FIG. 8 illustrates an arrangement of two camera apparatuses and a single projector apparatus that cooperatively constitute a distance measuring apparatus. Although the illustrated distance measuring apparatus has a two-dimensional arrangement, it is general that an actual distance measuring apparatus has a three-dimensional configuration.

The measurement target object 4 is constituted by two surfaces (i.e., surface 1 and surface 2). The projector projects a measurement pattern. A light beam vector (e.g., light beam vector 1 and light beam vector 2) represents the light beam of the pattern projected in this case, which corresponds to one pixel of the projector.

An observation vector (e.g., observation vector 1 and observation vector 2) represents the observation direction corresponding to one pixel observed by each camera apparatus.

In a case where multiple reflections do not occur, the observation direction of the camera 1 is expressed using the observation vector 1 if the camera 1 images a measuring point 1 and using the observation vector 2 if the camera 1 images a measuring point 2. Therefore, the measured distance accurately indicates the shape of the measurement target object 4 because the measuring point 1 and the measuring point 2 are both present on the surface 2.

In a case where multiple reflections occur, the light reflects at the measuring points 1 and 2 in directions indicated by a reflected light vector 1 and a reflected light vector 2, respectively. In this case, the angle of the reflected light vector 1 relative to the surface 2 is slightly different from the angle of the reflected light vector 2 relative to the surface 2.

More specifically, an inner product of the light beam vector 1 and the normal vector of the surface 2 and an inner product of the light beam vector 2 and the normal vector of the surface 2 are variable depending on the arrangement of the cameras and the projector or lens conditions (e.g., the observation vector 1 is not parallel to the observation vector 2). Therefore, strictly speaking, it is feasible to discriminate them with reference to the angle of the reflected light relative to a surface of the measurement target object 4. The smaller surfaces (i.e., similar reflection surfaces) that are substantially similar in optical reflection state can be acquired by classifying the inner product of each light beam vector and the surface 2 with reference to a predetermined threshold value.

The magnitude of the threshold value is dependent on the reflection coefficient of the measurement target object 4. Therefore, it is necessary to set the threshold value considering the material of the measurement target object 4 and the pixel resolution of the camera apparatus. As a segmenting method, the above-mentioned super pixel technique is usable to acquire smaller surfaces based on the inner product of each light beam vector and the surface 2, although any other appropriate technique is usable.

Although acquiring smaller surfaces is feasible as mentioned above, to simplify the following description, it is presumed that a threshold value is set to identify surfaces that can be regarded as being identical in the direction of reflected light on a measurement target object surface. Thus, it is presumed that the reflection angle of light reflected on each surface of the measurement target object is the same.

Figure 9:
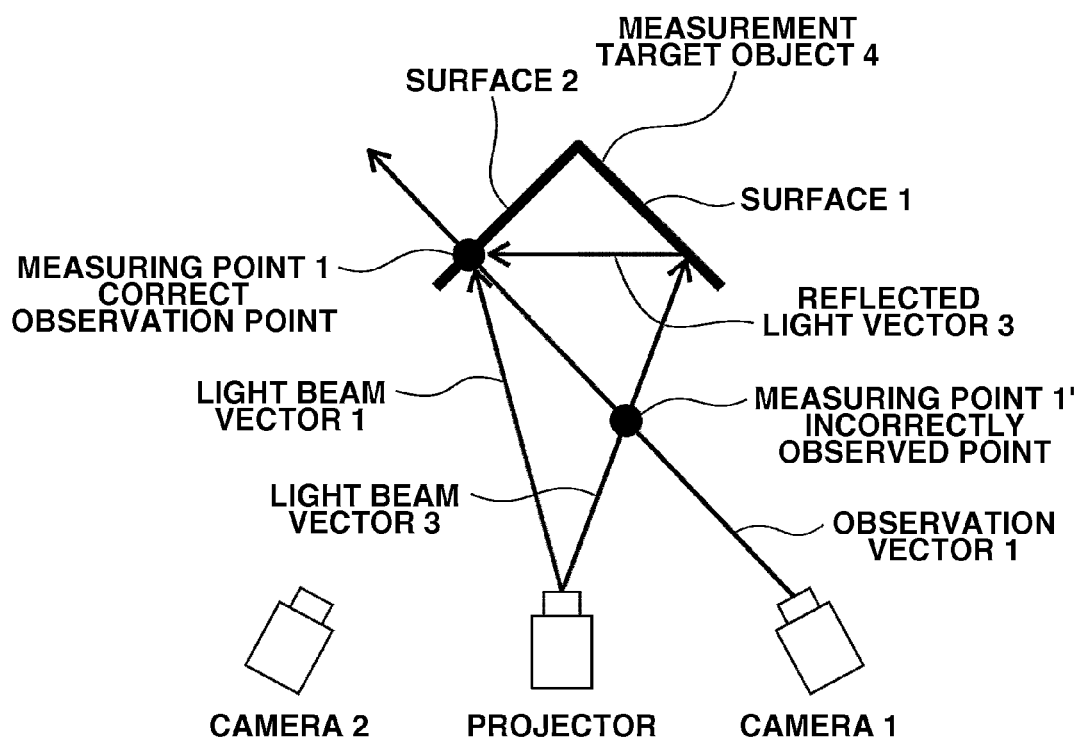
FIG. 9 illustrates an incorrect distance measurement that may be caused by multiple reflections.

FIG. 9 illustrates an occurrence of multiple reflections illustrated in FIG. 8.

First, a state where the distance value can be measured accurately is described. It is presumed that the projector projects a part of the projection pattern in the direction of the light beam vector 1. The light beam reflects on the surface 2 and the observation is performed in the direction of the observation vector 1 of the camera 1. In this case, the position of the measuring point 1 is regarded as the measuring point of the measurement target object 4 when the distance calculation is performed. In this case, the distance value can be accurately obtained.

Next, a state where the distance measurement is influenced by multiple reflections is described below. It is presumed that the projector projects a part of the projection pattern in the direction of a light beam vector 3. The light beam causes a reflection on the surface 1 and the reflected light reaches the position of the measuring point 1 on the surface 2.

The camera 1 can observe the light emitted in the direction of the light beam vector 3 and reflected on the surface 1 from the direction of the observation vector 1, similar to the above-mentioned accurately measurable state.

Therefore, the position of a measuring point 1' (i.e., a point where the light beam vector 3 intersects with the observation vector 1) is erroneously recognized in the measurement of distance.

Therefore, the position of the measuring point 1 is regarded as being present at a spatial point spaced from the measurement target object 4 (i.e., not on the surface 2 of the measurement target object 4) in calculating the distance value.

A method for preventing the occurrence of the erroneous measurement illustrated in FIG. 9 is described in detail below with reference to FIG. 10.

A method for spatially switching the projection pattern for each group of surfaces that are coincident with each other in the reflection direction of the light beam is described below.

The projection pattern, as already described with reference to FIG. 7, is processed by recognizing the state of each surface of the measurement target object 4, performing grouping of surfaces considering coincidence in reflection direction of the light beam, and performing pattern projection for respective surfaces of the group (i.e., surfaces that are not influenced by reflected light characteristics).

Figure 6:
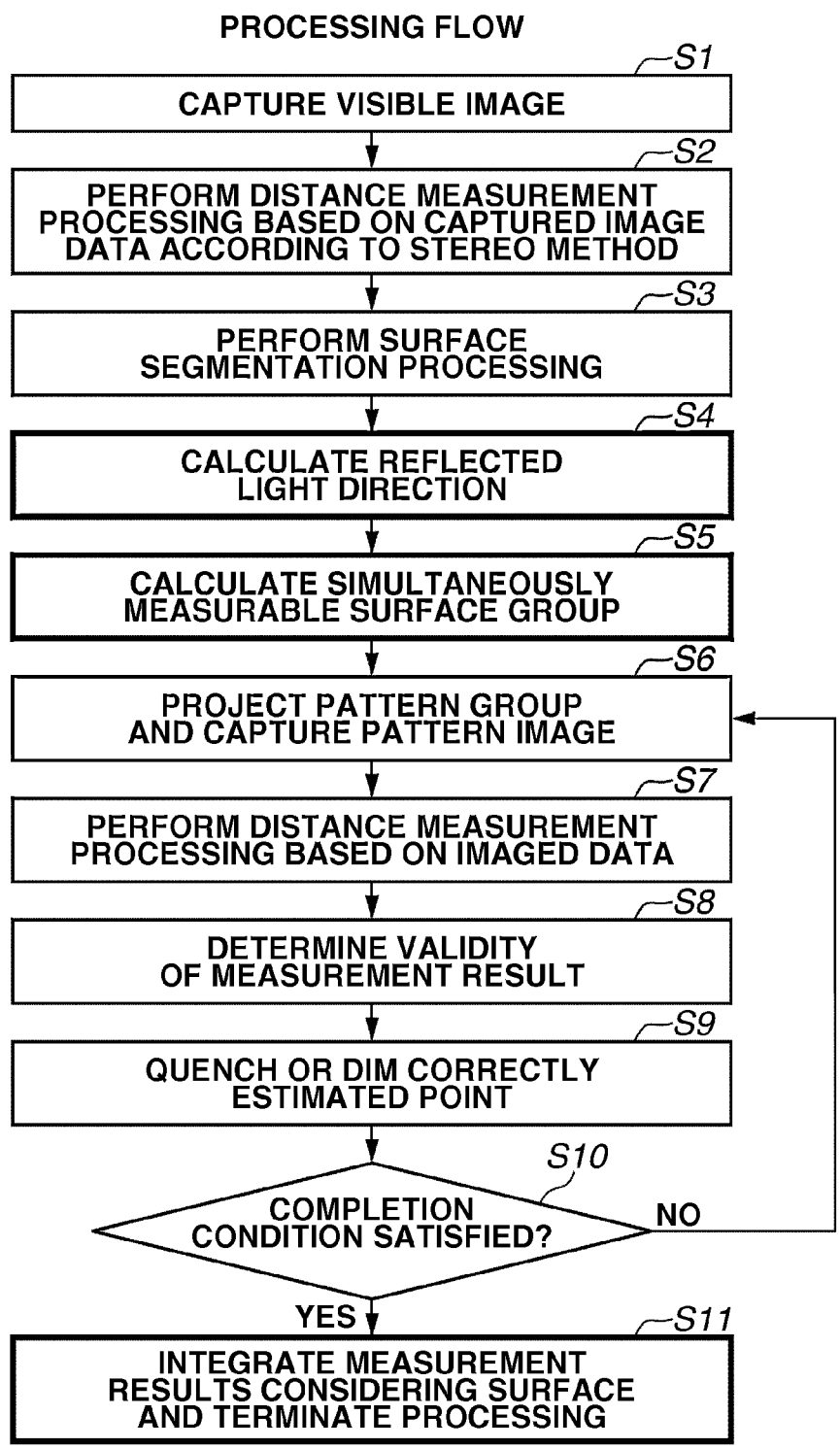
FIG. 6 is a flowchart illustrating example processing according to the first exemplary embodiment.

Each surface can be identified through the above-mentioned processing in steps S1 to S4 illustrated in FIG. 6. Further, as described with reference to FIG. 8, the reflection angle of light reflected on each surface can be determined based on the arrangement of two cameras 1 and 2 and the projector as well as based on a relationship between normal lines of respective surfaces.

Figure 10:
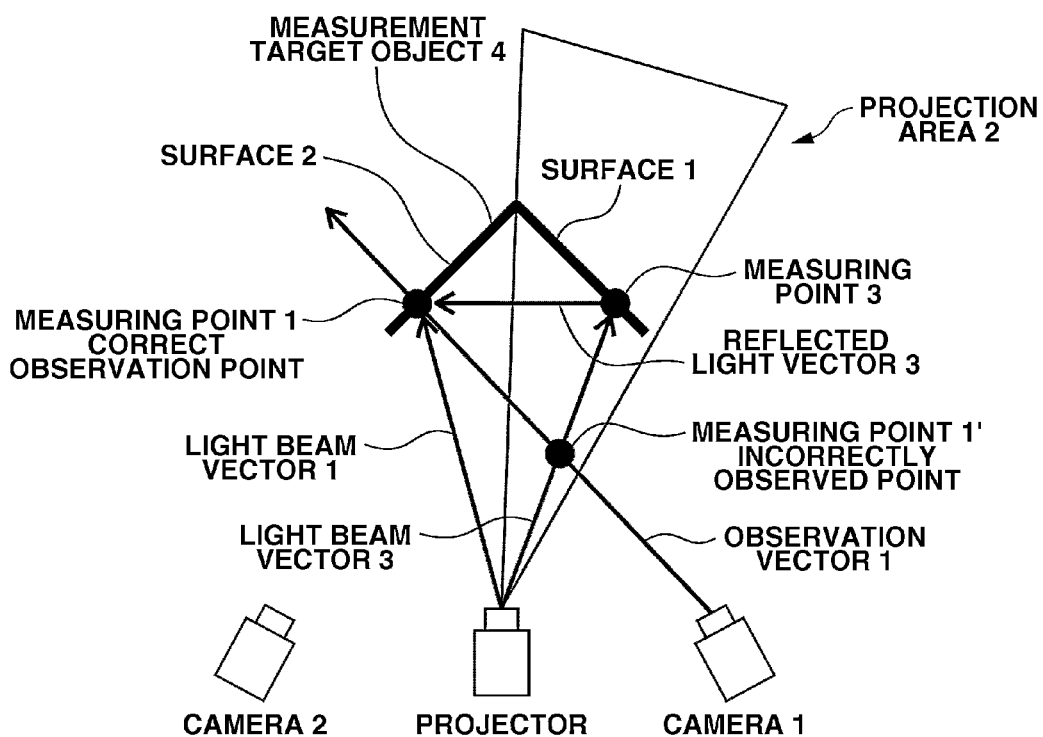
FIG. 10 illustrates elimination of the influence of multiple reflections.

In FIG. 10, the projection pattern is projected on the surface 1 in the region corresponding to only a projection area 2. In this state, the light beam vector 1 does not exist. Therefore, the measuring point 1 cannot be observed. If the light beam vector 3 reflects on the surface 1 as indicated by a reflected light vector 3, the measuring point 1' is erroneously recognized in the measurement of distance.

The measuring point 1' itself can be recognized as an incorrect point that is not present on the measurement target object 4 through the processing to be performed in steps S6 to S11 of the flowchart illustrated in FIG. 6.

As a result, the erroneously observed measuring point 1' can be deleted and only the measuring point 1 (i.e., the correct distance measurement result) can be observed.

Figure 11:
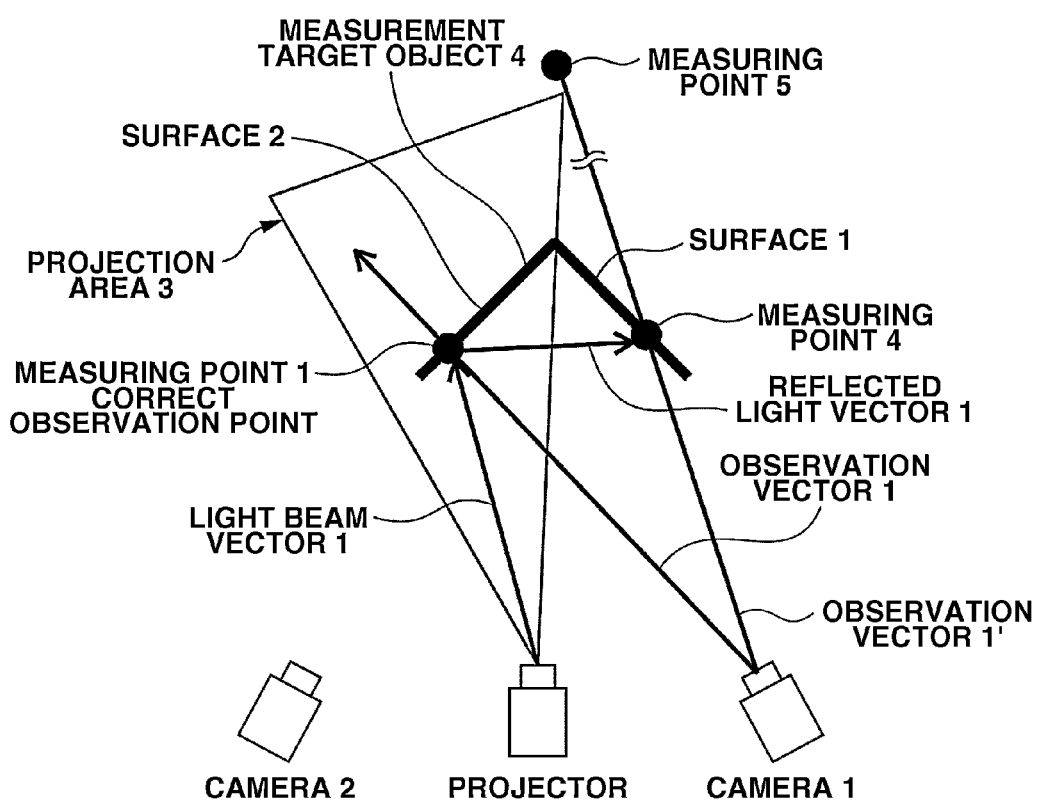
FIG. 11 illustrates elimination of the influence of multiple reflections.

FIG. 11 illustrates a pattern projected in another projection area, which is different from that illustrated in FIG. 10.

The pattern projection is performed by switching from the pattern projection area 2 illustrated in FIG. 10 to a pattern projection area 3. In this case, only the light beam vector 1 is present in the region corresponding to the projection pattern. In other words, there is not any light beam that causes a significant influence of multiple reflections. Therefore, it is feasible to accurately measure the distance from the measuring point 1 on the surface 2. If the light indicated by the light beam vector 1 reflects on the surface 2 as indicated by the reflected light vector 1, the light can be observed at a measuring point 4. The observation direction of the camera 1 in this case can be expressed by an observation vector 1'. Therefore, a measuring point 5 is recognized in the measurement of distance. The measuring point 5 can be recognized as an incorrect point through the processing to be performed in steps S6 to S11 of the flowchart illustrated in FIG. 6.

As a result, only the measuring point 1 (i.e., the correct distance measurement result) can be observed.

As mentioned above, it is feasible to accurately measure the distance of the measuring point on each of the surface 1 and the surface 2 while removing the influence of multiple reflections.

Figure 12:
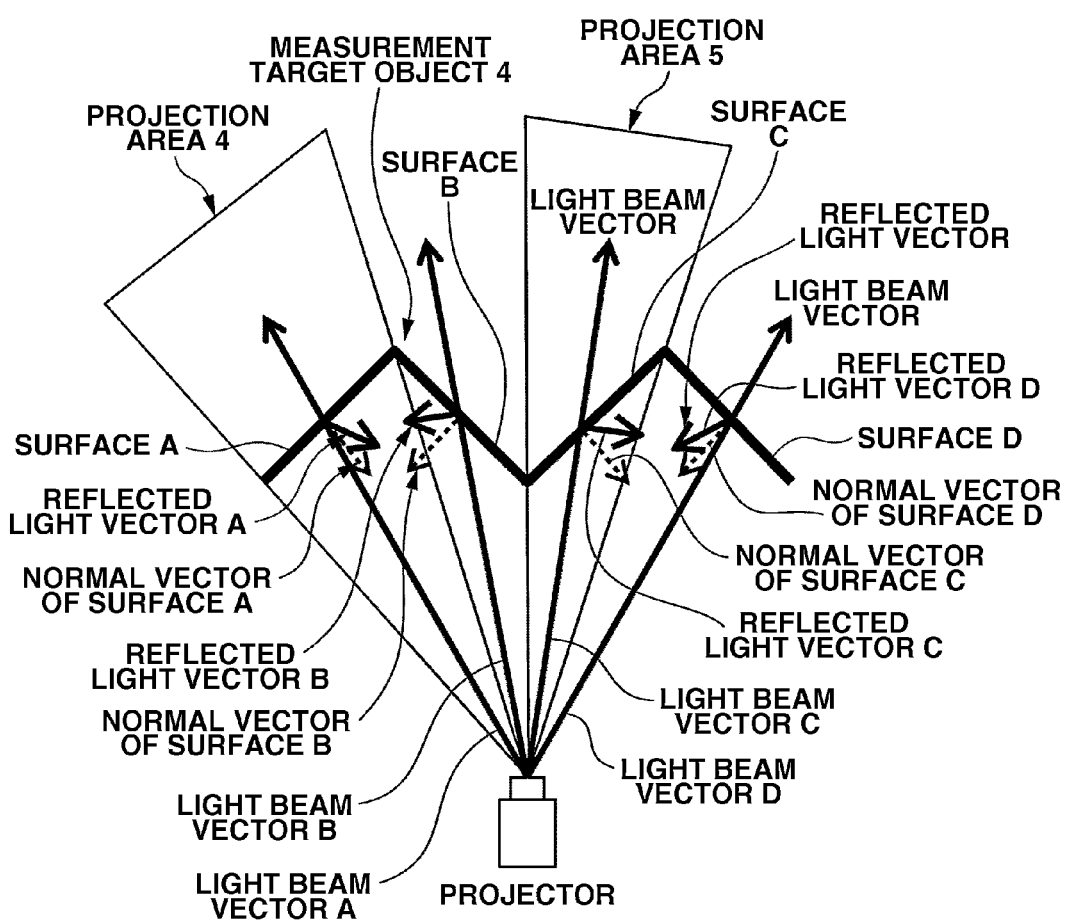
FIG. 12 illustrates an example grouping of projection patterns.

FIG. 12 illustrates a grouping of surfaces.

The projection pattern grouping can be realized by constituting a projection pattern that simultaneously illuminates surfaces that are less influenced by the reflected light.

The grouping processing can be performed in steps S10 and S11 illustrated in FIG. 6.

In FIG. 12, it is presumed that the measurement target object 4 is constituted by four surfaces.

More specifically, surface A, surface B, surface C, and surface D are four surfaces constituting the measurement target object 4. Further, light beam vector A, light beam vector B, light beam vector C, and light beam vector D represent light beams of the projection pattern to be used to measure the surface direction. It is presumed that optical reflection characteristics on respective surfaces are similar.

The respective surfaces A to D, when the pattern is illuminated in the directions indicated by the light beam vectors A to D, generate reflected light beams.

The light reflects in the direction indicated by each of reflected light vectors A to D. The direction of each one of the reflected light vectors A to D can be determined based on the normal vector direction of a corresponding one of the surfaces A to D and the angle of a corresponding one of the light beam vectors A to D according to the law of light reflection.

Next, a condition to be referred to in grouping surfaces that are similar in small reflection angle is described below.

If the reflection vectors of respective surfaces are opposite each other (i.e., when the inner product of two reflection vectors has a negative value), it can be determined that there is a higher possibility of causing multiple reflections.

On the other hand, if the reflection vectors are directed in the same direction (i.e., when the inner product of two reflection vectors has a positive value), it can be determined that there is a lower possibility of causing multiple reflections.

Further, even when the reflection vectors are opposite each other, there will be a lower possibility of causing multiple reflections if the absolute value of the inner product of two reflection vectors is close to 0.

The above-mentioned condition is referred to in determining whether the inner product of the reflection vectors is small and determining whether the surfaces cause multiple reflections.

As described above, there will be a lower possibility of causing multiple reflections when the absolute value of the inner product of two reflection vectors is close to 0. To identify the above-mentioned situation, it is useful to set an appropriate threshold value to discriminate the inner product of two reflection vectors based on the magnitude thereof. For example, it is desired that the material of the measurement target object 4 is taken into consideration in setting the threshold value.

By repetitively performing the above-mentioned conditional determination, it can be concluded that there is a higher possibility of causing multiple reflections between the surfaces A and B as indicated by the reflected light vectors thereof in FIG. 12. Similarly, it can be concluded that there is a higher possibility of causing multiple reflections between the surface C and the surface D as indicated by the reflected light vectors thereof.

On the other hand, it can be concluded that there is a lower possibility of causing multiple reflections between the surface A and the surface C as indicated by the reflected light vectors thereof. Similarly, it can be concluded that there is a lower possibility of causing multiple reflections between the surface B and the surface D as indicated by the reflected light vectors thereof.

Therefore, the distance measuring apparatus performs the projection pattern grouping processing in such a way as to combine the surface A with the surface C and combine the surface B with the surface D to obtain two projection pattern groups. Then, the distance measuring apparatus generates a projection pattern that can simultaneously illuminate the projection area 4 and the projection area 5 that correspond to the combination of the surface A and the surface C.

Similarly, the distance measuring apparatus can generate a projection pattern that can simultaneously illuminate two projection areas that correspond to the combination of the surface B and the surface D.

As mentioned above, the projection patterns Pt3 and Pt4 can be generated from the pattern Pt1 illustrated in FIG. 7. In the present exemplary embodiment, two types of projection patterns are generated through the division processing. However, three types of projection patterns or more can be generated through the division processing.

Dividing a projection pattern into a plurality of types of patterns is useful in that the generation of reflected light can be suppressed effectively. Further, it is easy to recognize an incorrect distance measuring point that may be generated by the reflected light. It becomes feasible to delete the incorrect point. As a result, the distance measuring apparatus can obtain accurate measurement values without being adversely influenced by multiple reflections. Further, the distance measuring apparatus can reduce the occurrence of multiple reflections while reducing the number of imaging operations.

As described above, the distance measuring apparatus according to the first exemplary embodiment can reduce the influence of multiple reflections and acquire valid distance measurement values while reducing the number of repetitive operations, in the system configured to quench or dim a projection pattern portion that corresponds to an area in which a valid distance measurement value has been obtained, because the distance measuring apparatus generates a plurality of types of projection patterns in such a way as to be less influenced by multiple reflections.

A second exemplary embodiment is different from the first exemplary embodiment in that the position and orientation of a measurement target object 4 is estimated based on a visible image of the measurement target object captured by the imaging unit 2 (i.e., the camera) and shape information about the measurement target object 4 stored beforehand. The distance measuring apparatus according to the second exemplary embodiment calculates the distance from the measurement target object 4 and acquires present measurement target information (e.g., the present position and orientation and the schematic shape) based on the estimated information.

The rest of processing to be performed in the second exemplary embodiment is similar to that described in the first exemplary embodiment. More specifically, the distance measuring apparatus according to the second exemplary embodiment performs three-dimensional measurement of a target object according to an active stereo method, using the pattern projection unit 1 (i.e., the projector) configured to project a measurement light pattern on the measurement target object and the imaging unit 2 (i.e., the camera) configured to capture an image of the measurement target object together with the measurement light pattern projected thereon.

In this case, the distance measuring apparatus according to the second exemplary embodiment performs distance measurement based on the measurement target information (e.g., the present position and orientation and the schematic shape) acquired in the preceding processing, while restricting a light pattern projection range in such a way as to prevent the pattern from being simultaneously projected on surfaces that may cause interreflection, similar to the above-described first exemplary embodiment.

Regarding the acquisition of the schematic shape according to the second exemplary embodiment, approximate information about the position and orientation of a measurement target object can be known by comparing the apparent magnitude of a measurement target object captured in a visible image, camera parameters (e.g., external parameters, internal parameters, and image distortion coefficients) stored in the parameter storage unit 36, and three-dimensional shape information about the measurement target object.

The above-mentioned technique is referred to as shape fitting technique, positioning technique, or registration technique. For example, phase only correlation method, least squares method, and Levenberg-Marquardt method are employable examples of the registration technique. Further, affine transformation and perspective projective transformation are employable examples of geometric coordinate transformation technique.

The distance measuring apparatus according to the second exemplary embodiment causes a positional change or rotation of a measurement target object in a virtual space using geometric transformation based on three-dimensional model information about the measurement target object, and estimates an image observable from the imaging unit 2 and coordinate information about a feature portion (e.g., a vertex or a surface) using the camera parameters and image distortion coefficients.

It is feasible to acquire the schematic shape (including position and orientation information) of the measurement target object by comparing a feature portion of a virtually generated measurement target object with a feature portion (e.g., an edge feature extracted using the Sobel filter is usable in the edge portion comparison) included in a visible image of an actually captured measurement target object.

The processing for calculating the schematic shape of a measurement target object according to the passive stereo method described in the first exemplary embodiment can be replaced by the above-mentioned processing.

The second exemplary embodiment is advantageous in that the above-mentioned processing is feasible using only one imaging unit (i.e., the camera).

Figure 13:
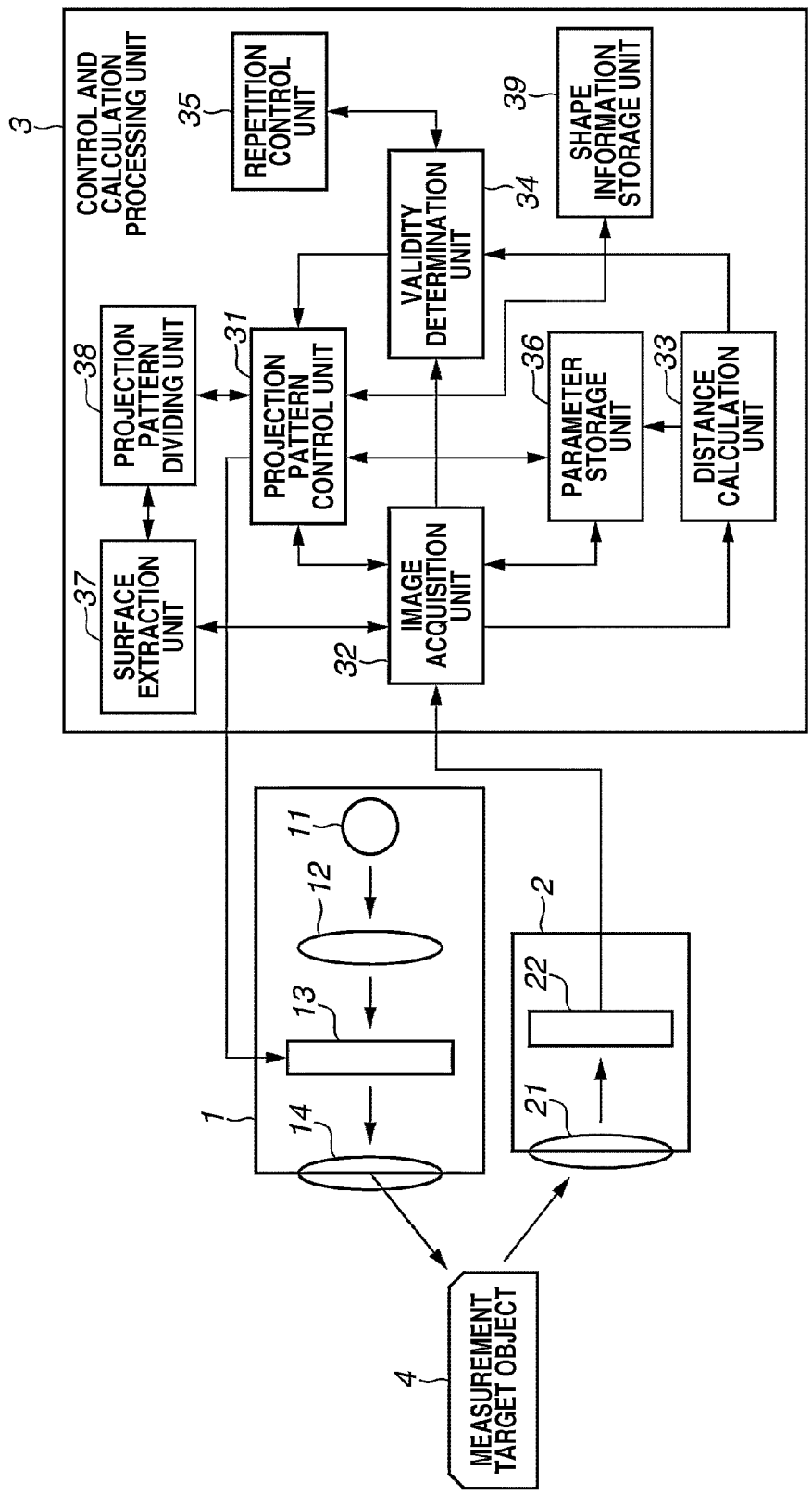
FIG. 13 illustrates a configuration example of a distance measuring apparatus according to a second exemplary embodiment.

FIG. 13 illustrates a configuration example of a distance measuring apparatus according to the present exemplary embodiment. As illustrated in FIG. 13, the distance measuring apparatus according to the present exemplary embodiment includes the projection unit 1, the imaging unit 2, and the control and calculation processing unit 3.

The following characteristic features are the differences between the second exemplary embodiment and the first exemplary embodiment.

The second exemplary embodiment is different from the first exemplary embodiment in that the three-dimensional measurement according to the passive stereo method is not performed and only one imaging unit 2 is used to obtain the above-mentioned information (i.e., position and orientation and schematic shape) about a measurement target object. The imaging unit 2 is constituted by a single imaging device (i.e., a camera) instead of using two imaging devices (cameras).

The imaging unit 2 includes a lens 21 and an image sensor 22 that are similar to those (i.e., internal constituent components of the imaging unit) described in the first exemplary embodiment.

In the second exemplary embodiment, three-dimensional shape information data of the measurement target object is recorded and stored beforehand in a shape information storage unit 39 before the distance measuring apparatus starts distance measurement processing.

The shape information data is a three-dimensional data indicating the shape or geometric information usable in computer-aided design (CAD). For example, DXF data (e.g., general CAD formats provided by Autodesk, Inc.) and PLY data are usable.

The shape information data includes coordinate data of a vertex of a measurement target object, normal line direction of a surface, and information about surface configuration data (e.g., a rectangular mesh or a triangular mesh). The above-mentioned three-dimensional shape information of the measurement target object is usable when the control and calculation processing unit 3 performs internal processing to calculate the schematic shape (including position and orientation) based on a visible image of measurement target parts captured by the imaging unit 2.

Figure 14:
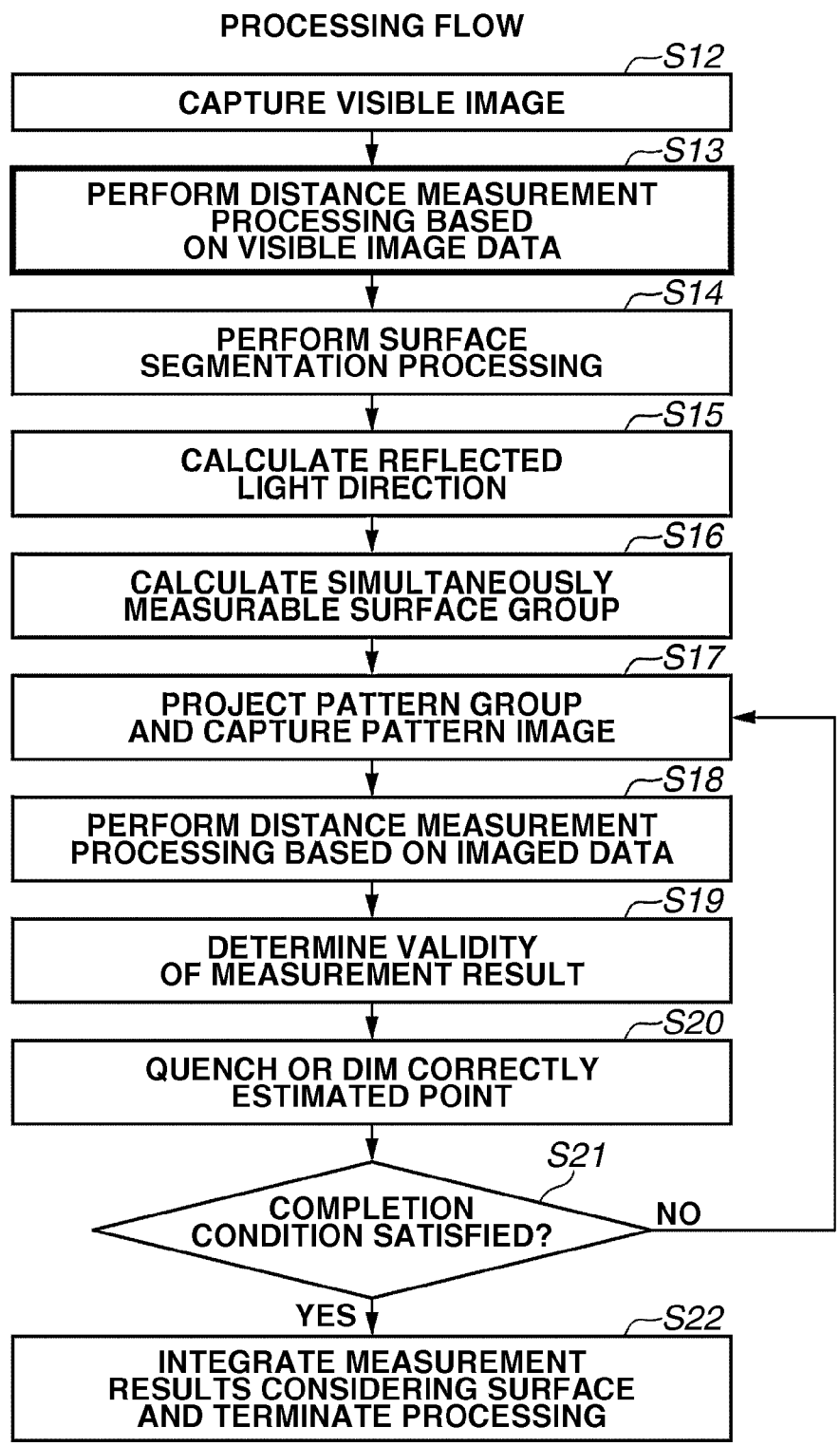
FIG. 14 is a flowchart illustrating example processing according to the second exemplary embodiment.

Next, an example flow of processing according to the second exemplary embodiment is described in detail below with reference to a flowchart illustrated in FIG. 14. The flowchart according to the second exemplary embodiment illustrated in FIG. 14 includes processing to be performed in step S13, which is not described in the flowchart illustrated in FIG. 6.

As described in the first exemplary embodiment, the processing performed in step S2 is triangulation-based distance measuring processing according to the passive stereo method to acquire schematic shape information about a measurement target object. In contrast, the processing to be performed in step S13 in the second exemplary embodiment includes capturing a visible image of a measurement target object and acquiring schematic shape information about the measurement target object by recognizing and measuring the position and orientation of the measurement target object captured in the visible image.

In step S13, the position of a feature quantity included in the shape information about the measurement target object is compared with the position of a feature quantity of the measurement target object in an actual visible image to obtain an error. Then, fitting processing is applied to the obtained error to calculate an estimated position of the measurement target object. Then, the schematic shape of the measurement target object can be obtained based on the estimated position.

In the present exemplary embodiment, as discussed in the following literature, estimating the position in the captured image is feasible by using model data representing the shape of the measurement target object (i.e., an ellipse in the following literature).

The journal of the Institute of Electronics, Information and Communication Engineers, Vol. 92, No. 4, 2009.

The feature quantity included in the shape information about the measurement target object is edge information generated using the Sobel filter. Any other technique (e.g., Canny method) is usable to acquire edge feature quantity. Further, image feature quantity (e.g., SIFT) other than the edge feature quantity is usable if it can be calculated based on three-dimensional shape data (such as CAD data) or a visible image.

The schematic shape (including position and orientation) of the measurement target object can be calculated based on camera orientation information stored in the parameter storage unit 36 by performing optimization calculation in such a way as to obtain coordinate values X, Y, and Z of the measurement target object according to the above-mentioned formulae 1, 2, and 3 (i.e., model formulae according to the triangulation method). The details about the above-mentioned technique are discussed in the following literature.

Figure 15A:
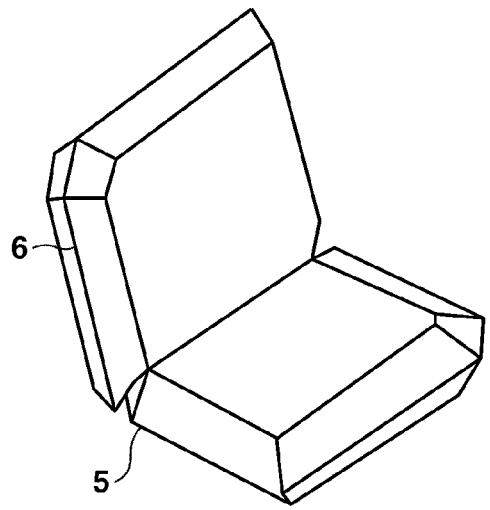
FIGS. 15A and 15B illustrates an example of model fitting.

Yuuki Iwamoto, Yasuyuki Sugaya, and Kenich Kanatani, "Bundle Adjustment for 3-D Reconstruction: Implementation and Evaluation", Journal of Information Processing Society of Japan IPSJ SIG Technical Report The CAD data stored in the shape storage unit 39 and fitting to the measurement target object are schematically described below with reference to FIGS. 15A and 15B.

The shape storage unit 39 stores shape information data 5 indicating the measurement target object.

The shape information data 5 can be any information usable in design (e.g., CAD). Further, the shape information data 5 can be shape data obtained beforehand using another three-dimensional distance measuring apparatus.

The shape information data 5 represents a solid body constituted by a plurality of flat surfaces each being referred to as "polygon." Flat surface information includes a recording of normal line direction. The flat surface information indicates the geometric arrangement and direction of each surface constituting the measurement target object. The flat surface data includes edge information indicating an edge portion of a surface constituting the measurement target object. More specifically, the edge information indicates a corner (or ridge) portion 6 that connects two adjacent surfaces constituting the measurement target object. An ordinary imaging apparatus (e.g., a camera) can extract each edge portion through image processing using the Sobel filter because the edge portion can be discriminated based on difference in luminance when it is observed through the imaging apparatus.

Therefore, in step S13, the distance measuring apparatus calculates estimated information about the edge information of the measurement target object based on the shape information data stored in the shape information storage unit 39 and calculates edge information obtained through image processing performed on a captured visible image. The distance measuring apparatus calculates an error between the corresponding edge positions and estimates the position and orientation of the measurement target object based on the obtained error.

Figure 15B:
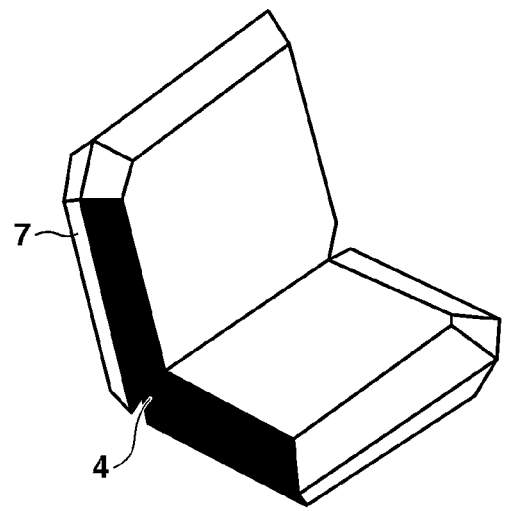

FIG. 15B illustrates a calculation result.

The edge information comparison processing includes comparison about a superficial state (i.e., an estimated value of the edge information obtained in the visible image) that can be observed from the imaging unit 2.

The distance measuring apparatus performs fitting processing applied to estimated edge information 7 and a visible image 4 captured by the imaging unit 2 (actually an edge image of the visible image 4 processed using the Sobel filter).

In the fitting processing, it is feasible to realize high-accurate positioning by performing optimization calculation according to the phase only correlation method or the least squares method, as mentioned above.

Finally, the schematic shape (including position and orientation) of the measurement target object can be calculated based on the camera orientation information stored in the parameter storage unit 36 by performing optimization calculation in such a way as to obtain coordinate values X, Y, and Z of the measurement target object according to the above-mentioned formulae 1, 2, and 3 (i.e., model formulae according to the triangulation method).

Processing to be performed in step S14 and subsequent steps is similar to the processing described in the first exemplary embodiment.

Accordingly, the distance measuring apparatus according to the second exemplary embodiment can generate a projection pattern that is less influenced by multiple reflections, using only one camera, and can reduce the influence of multiple reflections as described in the first exemplary embodiment. Thus, the distance measuring apparatus according to the second exemplary embodiment can obtain valid distance measurement values.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-267557 filed Dec. 6, 2012, which is hereby incorporated by reference herein in its entirety.

What is claimed is:

1. An apparatus comprising:
a grouping unit configured to group surfaces based on approximate shape information of a target object;
a determination unit configured to determine a pattern, based on the surfaces grouped by the grouping unit;
a projection control unit configured to control a projection unit to project the determined pattern on the target object;
a first image obtaining unit configured to obtain a first captured image including the target object on which the determined pattern is projected by the projection unit, captured by a first capturing unit;
a second image obtaining unit configured to obtain a second captured image of the target object on which the pattern is projected by the projection unit, the second captured image being captured by a second capturing unit arranged in a position different from that of the first capturing unit;
a first acquisition unit configured to acquire first distance information of the target object based on the first captured image captured by the first capturing unit;
a second acquisition unit configured to acquire second distance information of the target object based on the second captured image;
a decision unit configured to decide, for each area of the target object, whether the acquired first distance information and the acquired second distance information are valid based on the first distance information and the second distance information; and
a control unit configured to reduce a luminance of the pattern to be projected on the area for which the decision unit has decided that first distance information and second distance information are valid,
wherein each unit is implemented by one or more processors, circuitry or a combination thereof.

2. The apparatus according to claim 1, wherein the extraction unit is configured to extract the surfaces based on an inclination of each surface that constitutes the target object.

3. The apparatus according to claim 1, wherein the extraction unit is configured to extract the surfaces based on edge information about the target object.

4. The apparatus according to claim 1, wherein the determination unit is configured to determine the pattern by dividing a predetermined pattern group by group so that the pattern is not projected onto the surface other than the grouped surfaces.

5. The apparatus according to claim 4, wherein the projection unit is configured to successively project divided light patterns.

6. The apparatus according to claim 4, further comprising:
a completion determination unit configured to determine whether a predetermined completion determination condition is satisfied, after an operation of each of a second determination unit and a control unit has been completed one time,
wherein sequential processing by each unit according to claim 4 is repeated at least one time if the completion determination unit determines that the completion determination condition is not yet satisfied.

7. The apparatus according to claim 6, wherein the completion determination unit is configured to perform a determination by the completion determination unit based on the number of repetitions of sequential processing.

8. The apparatus according to claim 6, wherein the completion determination unit is configured to perform a determination by the completion determination unit based on time required to accomplish sequential processing.

9. The apparatus according to claim 6, wherein the completion determination unit is configured to perform a determination by the completion determination unit based on a result of the processing.

10. The apparatus according to claim 6, wherein the completion determination unit is configured to perform a determination by the completion determination unit based on a past measurement result and a current measurement result obtained by each unit.

11. The apparatus according to claim 1, further comprising:
the projection unit configured to project a pattern; and
the first and second capturing units each configured to capture an image.

12. A method comprising:
grouping, via a grouping unit, surfaces based on approximate shape information of a target object;
determining, via a determination unit, a pattern, based on the grouped surfaces;
controlling, via a projection control unit, a projection unit to project the determined pattern on the target object;
obtaining, by a first image obtaining unit, a first captured image including the target object on which the determined pattern is projected by the projection unit, captured by a first capturing unit;
obtaining, via a second image obtaining unit, a second captured image of the target object on which the pattern is projected by the projection unit, the second captured image being captured by a second capturing unit arranged in a position different from that of the first capturing unit;
acquiring, via a first acquisition unit, first distance information of the image captured by the first capturing unit;
acquiring, via a second acquisition unit, second distance information of the target object based on the second captured image;
deciding, via a decision unit, for each area of the target object, whether the acquired first distance information and the acquired second distance information are valid based on the first distance information and the second distance information; and
reducing, via a control unit, a luminance of the pattern to be projected on the area for which the decision unit has decided that first distance information and second distance information are valid,
wherein each unit is implemented by one or more processors, circuitry or a combination thereof.

13. A non-transitory computer-readable storage medium storing a program that causes a computer to implement a method comprising:
grouping, via a grouping unit, surfaces based on approximate shape information of a target object;
determining, via a determination unit, a pattern, based on the grouped surfaces;
controlling, via a projection control unit, a projection unit to project the determined pattern on the target object;
obtaining, by a first image obtaining unit, a first captured image including the target object on which the determined pattern is projected by the projection unit, captured by a first capturing unit;
obtaining, via a second image obtaining unit, a second captured image of the target object on which the pattern is projected by the projection unit, the second captured image being captured by a second capturing unit arranged in a position different from that of the first capturing unit;
acquiring, by a first acquisition unit, first distance information of the target object based on the first captured image captured by the first capturing unit;
acquiring, via a second acquisition unit, second distance information of the target object based on the second captured image;
deciding, via a decision unit, for each area of the target object, whether the acquired first distance information and the acquired second distance information are valid based on the first distance information and the second distance information; and
reducing, via a control unit, a luminance of the pattern to be projected on the area for which the decision unit has decided that first distance information and second distance information are valid,
wherein each unit is implemented by one or more processors, circuitry or a combination thereof.

* * * * *